United States Patent
Green et al.

(10) Patent No.: US 6,284,347 B1
(45) Date of Patent: *Sep. 4, 2001

(54) CELLULAR PANEL AND METHOD AND APPARATUS FOR MAKING THE SAME

(75) Inventors: Jace N. Green; Bryan K. Ruggles, both of Salt Lake City, UT (US); Richard F. Chacon, Brea, CA (US)

(73) Assignee: Newell Operating Company, Freeport, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/442,090

(22) Filed: Nov. 11, 1999

Related U.S. Application Data

(63) Continuation of application No. 08/880,569, filed on Jun. 23, 1997, now Pat. No. 6,045,890, which is a continuation of application No. 08/273,469, filed on Jul. 11, 1994, now abandoned.

(51) Int. Cl.$^7$ ................................. B32B 1/00; B32B 3/28
(52) U.S. Cl. .................. 428/178; 428/116; 428/118; 428/179; 428/181; 428/182; 428/190; 428/304.4
(58) Field of Search .................................... 428/178, 179, 428/181, 182, 190, 116, 118, 304.4

(56) References Cited

U.S. PATENT DOCUMENTS

| | | |
|---|---|---|
| Re. 30,254 | 4/1980 | Rasmussen . |
| Re. 31,129 | 1/1983 | Rasmussen . |
| 1,764,789 | 6/1930 | Heald . |
| 1,937,342 | 11/1933 | Higbie . |

(List continued on next page.)

FOREIGN PATENT DOCUMENTS

| | | |
|---|---|---|
| 129793 | 11/1948 | (AU) . |
| 249985 | 3/1964 | (AU) . |
| 737901 | 7/1966 | (CA) . |
| 331432 | 9/1958 | (CH) . |
| 423207 | 4/1967 | (CH) . |
| 476482 | 9/1969 | (CH) . |
| 494338 | 9/1970 | (CH) . |
| 382758 | 10/1923 | (DE) . |
| 684202 | 11/1939 | (DE) . |
| 12 41 361 | 5/1967 | (DE) . |
| 19 65 360 | 12/1969 | (DE) . |
| 19 42 194 | 1/1971 | (DE) . |
| 27 35 654 | 2/1979 | (DE) . |
| 28 40 023 | 3/1980 | (DE) . |
| 29 23 233 | 12/1980 | (DE) . |
| 29 36 811 | 4/1981 | (DE) . |
| 35 25 515 | 1/1987 | (DE) . |
| 89 06 284 | 9/1989 | (DE) . |
| 122088 | 4/2000 | (DE) . |
| 305 092 A2 | 8/1978 | (EP) . |
| 549216 B1 | 3/1984 | (EP) . |
| 029 442 B1 | 11/1984 | (EP) . |
| 379 242 A1 | 1/1989 | (EP) . |
| 566355 A1 | 4/1993 | (EP) . |
| 482 793 B1 | 12/1993 | (EP) . |
| 654 577 A1 | 10/1994 | (EP) . |
| 742 339 A2 | 11/1996 | (EP) . |
| 1166398 | 11/1958 | (FR) . |
| 1309194 | 10/1962 | (FR) . |
| 1364674 | 10/1964 | (FR) . |
| 1373515 | 1/1965 | (FR) . |
| 1381472 | 3/1965 | (FR) . |
| 1465261 | 11/1966 | (FR) . |
| 1480262 | 4/1967 | (FR) . |
| 1521488 | 3/1968 | (FR) . |
| 1526507 | 4/1968 | (FR) . |
| 1568745 | 4/1969 | (FR) . |
| 1585159 | 1/1970 | (FR) . |
| 2398170 | 7/1977 | (FR) . |
| 951484 | 3/1964 | (GB) . |
| 988064 | 4/1965 | (GB) . |
| 1116934 | 6/1966 | (GB) . |
| 1036126 | 7/1966 | (GB) . |
| 1228677 | 4/1971 | (GB) . |
| 1308296 | 2/1973 | (GB) . |
| 1494842 | 12/1977 | (GB) . |
| 2226054A | 6/1990 | (GB) . |
| 54-101878 | 10/1979 | (JP) . |
| 6706563 | 11/1968 | (NL) . |
| 7805464 | 5/1978 | (NL) . |
| 1368189 | 1/1988 | (RU) . |
| WO 80/02712 | 12/1980 | (WO) . |
| WO 91/10566 | 7/1991 | (WO) . |

\* cited by examiner

*Primary Examiner*—Shelley A. Dodson
(74) *Attorney, Agent, or Firm*—Foley & Lardner

(57) ABSTRACT

An expandable and contractible cellular panel 10 comprises a plurality of parallel, aligned, elongated tubular sections 12 secured together at the median region of their adjacent longitudinal margins to form the panel 10. The adjacent tubular sections 12 of the panel 10 are made of a pair of substantially identical separate strips of sheet material from those forming the other adjacent tubular sections 12. The various adjacent pairs of strips are laminated together along their confronting longitudinal margins. Each strip is made of at least two separate flexible substrate sheets 18,20 having completely different appearances, and are secured together by welding together their longitudinal margins. The corresponding substrate sheets 18,20 of all the strips have corresponding positions in the panel 10, so that all the substrate sheets having one appearance are on one side of the panel 10 and those having a different appearance are on the other side of the panel 10, and the welded portions 28,28' are located in the laminated portion of the strips where they are hidden from view.

37 Claims, 19 Drawing Sheets

U.S. PATENT DOCUMENTS

| | | |
|---|---|---|
| 2,020,639 | 11/1935 | Grayson et al. . |
| 2,029,675 | 2/1936 | Schlamp . |
| 2,110,145 | 3/1938 | Loehr . |
| 2,140,049 | 12/1938 | Grauel . |
| 2,201,356 | 5/1940 | Terrell . |
| 2,267,869 | 12/1941 | Loehr . |
| 2,571,372 | 10/1951 | Martin . |
| 2,577,227 | 12/1951 | Brent . |
| 2,714,413 | 8/1955 | Hunter et al. . |
| 2,822,840 | 2/1958 | Reynolds et al. . |
| 2,856,324 | 10/1958 | Janowski . |
| 2,865,446 | 12/1958 | Cole . |
| 2,914,122 | 11/1959 | Pinto . |
| 2,994,370 | 8/1961 | Pinto . |
| 3,007,698 | 11/1961 | MacDonald et al. . |
| 3,025,964 | 3/1962 | Sommers et al. . |
| 3,032,099 | 5/1962 | Croxen . |
| 3,074,839 | 1/1963 | May et al. . |
| 3,077,223 | 2/1963 | Hartsell et al. . |
| 3,082,141 | 3/1963 | Steele et al. . |
| 3,164,507 | 1/1965 | Masuda . |
| 3,165,820 | 1/1965 | Fromson . |
| 3,189,501 | 6/1965 | White . |
| 3,378,429 | 4/1968 | Obeda . |
| 3,384,519 | 5/1968 | Froget . |
| 3,384,527 | 5/1968 | Fener . |
| 3,428,515 | 2/1969 | Lorentzen . |
| 3,457,132 | 7/1969 | Tuma et al. . |
| 3,493,450 | 2/1970 | Judge, Jr. . |
| 3,657,033 | 4/1972 | Sager . |
| 3,660,195 | 5/1972 | Hoyt . |
| 3,661,665 | 5/1972 | Froget . |
| 3,682,752 | 8/1972 | Hunter et al. . |
| 3,701,376 | 10/1972 | Froget . |
| 3,713,954 | 1/1973 | Clark et al. . |
| 3,851,699 | 12/1974 | Shapiro . |
| 3,939,033 | 2/1976 | Grgach et al. . |
| 3,946,789 | 3/1976 | Ronkholz-Tolle . |
| 3,963,549 | 6/1976 | Rasmussen . |
| 4,019,554 | 4/1977 | Rasmussen . |
| 4,039,019 | 8/1977 | Hopper . |
| 4,097,327 | 6/1978 | Calemard . |
| 4,117,180 | 9/1978 | DeWoskin . |
| 4,137,111 | 1/1979 | Hansen . |
| 4,157,719 | 6/1979 | DeWoskin . |
| 4,177,100 | 12/1979 | Pennington . |
| 4,194,550 | 3/1980 | Hooper . |
| 4,224,091 | 9/1980 | Sager . |
| 4,256,526 | 3/1981 | McDaniel . |
| 4,259,399 | 3/1981 | Hill . |
| 4,288,485 | 9/1981 | Suominen . |
| 4,311,540 | 1/1982 | Hill . |
| 4,333,791 | 6/1982 | Onishi . |
| 4,344,474 | 8/1982 | Berman . |
| 4,346,132 | 8/1982 | Cheng et al. . |
| 4,377,431 | 3/1983 | Chodosh . |
| 4,386,454 | 6/1983 | Hopper . |
| 4,394,208 | 7/1983 | Wang et al. . |
| 4,400,227 | 8/1983 | Riemersma . |
| 4,404,052 | 9/1983 | Persson et al. . |
| 4,406,720 | 9/1983 | Wang et al. . |
| 4,414,045 | 11/1983 | Wang et al. . |
| 4,450,027 | 5/1984 | Colson . |
| 4,478,659 | 10/1984 | Hall . |
| 4,491,491 | 1/1985 | Stumpf . |
| 4,496,407 | 1/1985 | Lowery, Sr. et al. . |
| 4,500,380 | 2/1985 | Bova . |
| 4,534,819 | 8/1985 | Payer et al. . |
| 4,535,828 | 8/1985 | Brockhaus . |
| 4,560,427 | 12/1985 | Flood . |
| 4,603,072 | 7/1986 | Colson . |
| 4,605,454 | 8/1986 | Sayovitz et al. . |
| 4,610,750 | 9/1986 | Mango . |
| 4,631,108 | 12/1986 | Colson . |
| 4,631,217 | 12/1986 | Anderson . |
| 4,659,614 | 4/1987 | Vitale . |
| 4,673,600 | 6/1987 | Anderson . |
| 4,676,855 | 6/1987 | Anderson . |
| 4,677,012 | 6/1987 | Anderson . |
| 4,677,013 | 6/1987 | Anderson . |
| 4,685,986 | 8/1987 | Anderson . |
| 4,686,136 | 8/1987 | Homonoff et al. . |
| 4,693,771 | 9/1987 | Payet et al. . |
| 4,711,693 | 12/1987 | Holzer, Jr. . |
| 4,713,132 | 12/1987 | Abel et al. . |
| 4,732,630 | 3/1988 | Schnebly . |
| 4,758,293 | 7/1988 | Samida . |
| 4,767,492 | 8/1988 | Fukusima et al. . |
| 4,784,892 | 11/1988 | Storey et al. . |
| 4,795,515 | 1/1989 | Kao et al. . |
| 4,798,639 | 1/1989 | Yamaguchi . |
| 4,849,039 | 7/1989 | Colson et al. . |
| 4,884,612 | 12/1989 | Schnebly et al. . |
| 4,885,190 | * 12/1989 | Schnebly .......................... 427/207.1 |
| 4,895,611 | 1/1990 | Bryniarski et al. . |
| 4,928,369 | 5/1990 | Schnebly et al. . |
| 4,938,817 | 7/1990 | Langley . |
| 4,948,445 | 8/1990 | Hees . |
| 4,957,577 | * 9/1990 | Huebner .............................. 156/197 |
| 4,984,617 | 1/1991 | Corey . |
| 5,043,038 | 8/1991 | Colson . |
| 5,061,331 | 10/1991 | Gute . |
| 5,078,195 | 1/1992 | Schon . |
| 5,087,320 | 2/1992 | Neuwirth . |
| 5,104,469 | 4/1992 | Colson . |
| 5,106,444 | 4/1992 | Corey et al. . |
| 5,120,376 | 6/1992 | Hong . |
| 5,151,151 | 9/1992 | Kao et al. . |
| 5,158,632 | 10/1992 | Colson et al. . |
| 5,167,740 | 12/1992 | Michaelis et al. . |
| 5,188,160 | 2/1993 | Jelic . |
| 5,205,334 | 4/1993 | Judkins . |
| 5,205,891 | 4/1993 | Neff . |
| 5,228,936 | * 7/1993 | Goodhue .............................. 156/260 |
| 5,232,529 | 8/1993 | Miyake . |
| 5,287,908 | 2/1994 | Hoffmann et al. . |
| 5,308,435 | 5/1994 | Ruggles et al. . |
| 5,313,998 | 5/1994 | Colson et al. . |
| 5,313,999 | 5/1994 | Colson et al. . |
| 5,320,154 | 6/1994 | Colson et al. . |
| 5,339,882 | 8/1994 | Judkins . |
| 5,339,883 | 8/1994 | Colson et al. . |
| 5,392,832 | 2/1995 | Colson et al. . |
| 5,394,922 | 3/1995 | Colson et al. . |
| 5,419,385 | 5/1995 | Vogel et al. . |
| 5,441,592 | 8/1995 | Ruggles et al. . |
| 5,454,414 | 10/1995 | Colson et al. . |
| 5,456,304 | 10/1995 | Colson et al. . |
| 5,482,750 | 1/1996 | Colson et al. . |
| 5,490,553 | 2/1996 | Colson et al. . |
| 5,558,925 | 9/1996 | Fritzman . |
| 5,603,369 | 2/1997 | Colson et al. . |
| 5,620,035 | 4/1997 | Judkins . |
| 5,888,639 | * 3/1999 | Green et al. ....................... 428/304.4 |
| B1 4,603,072 | 7/1991 | Colson . |

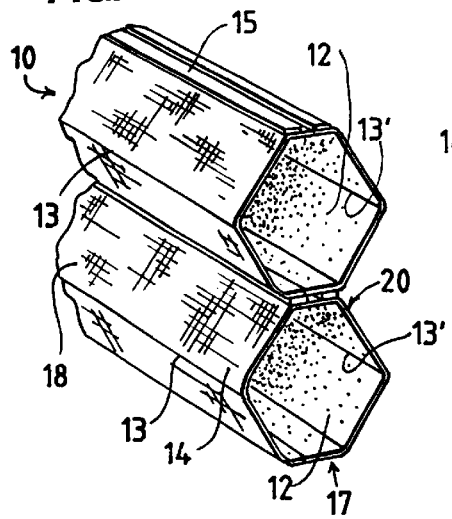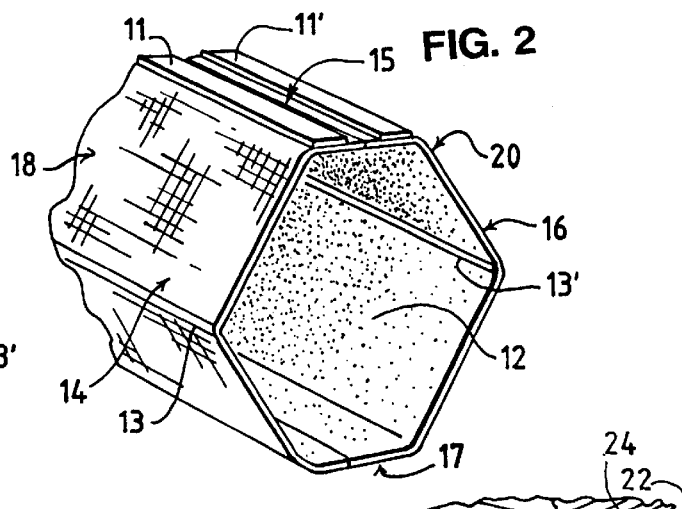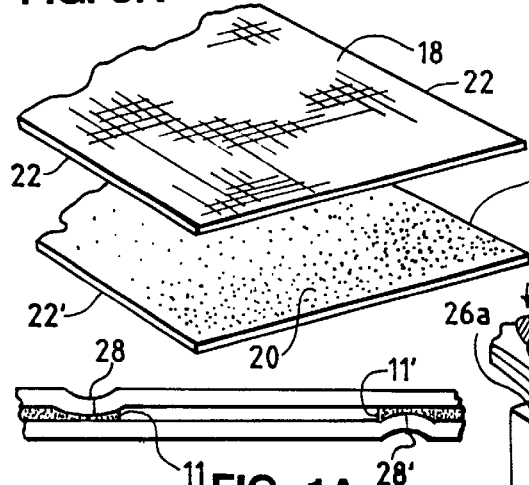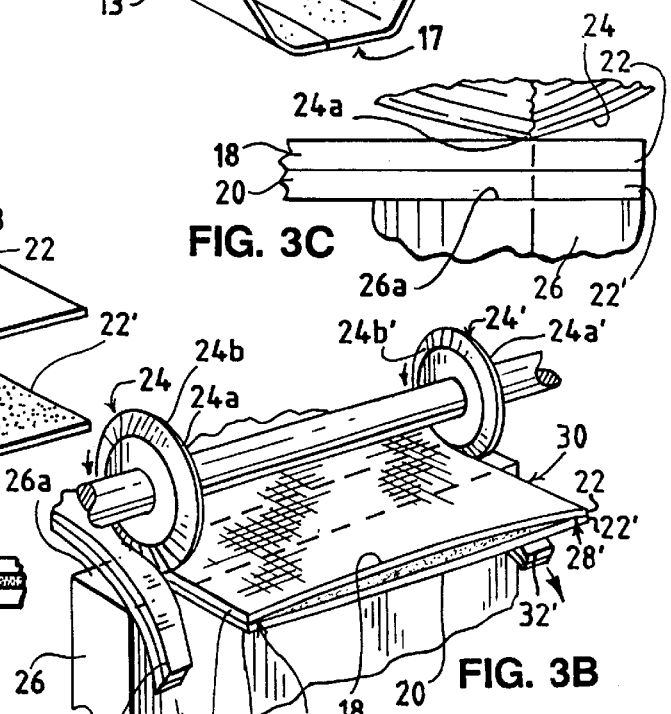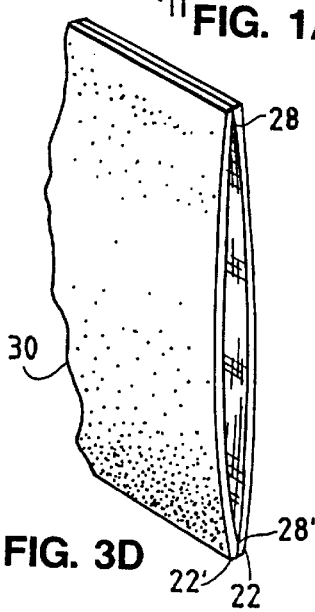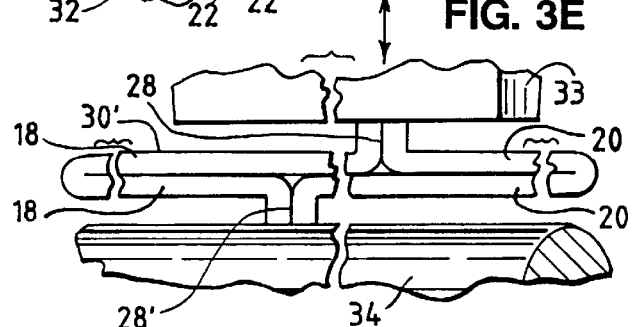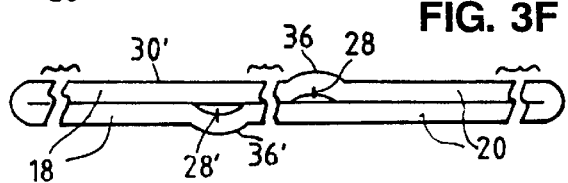

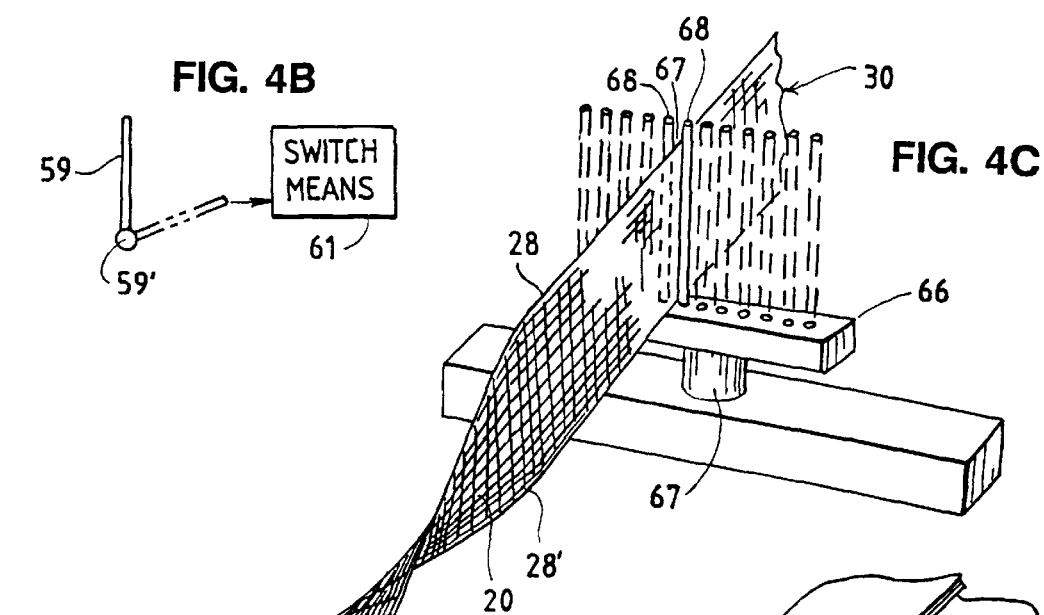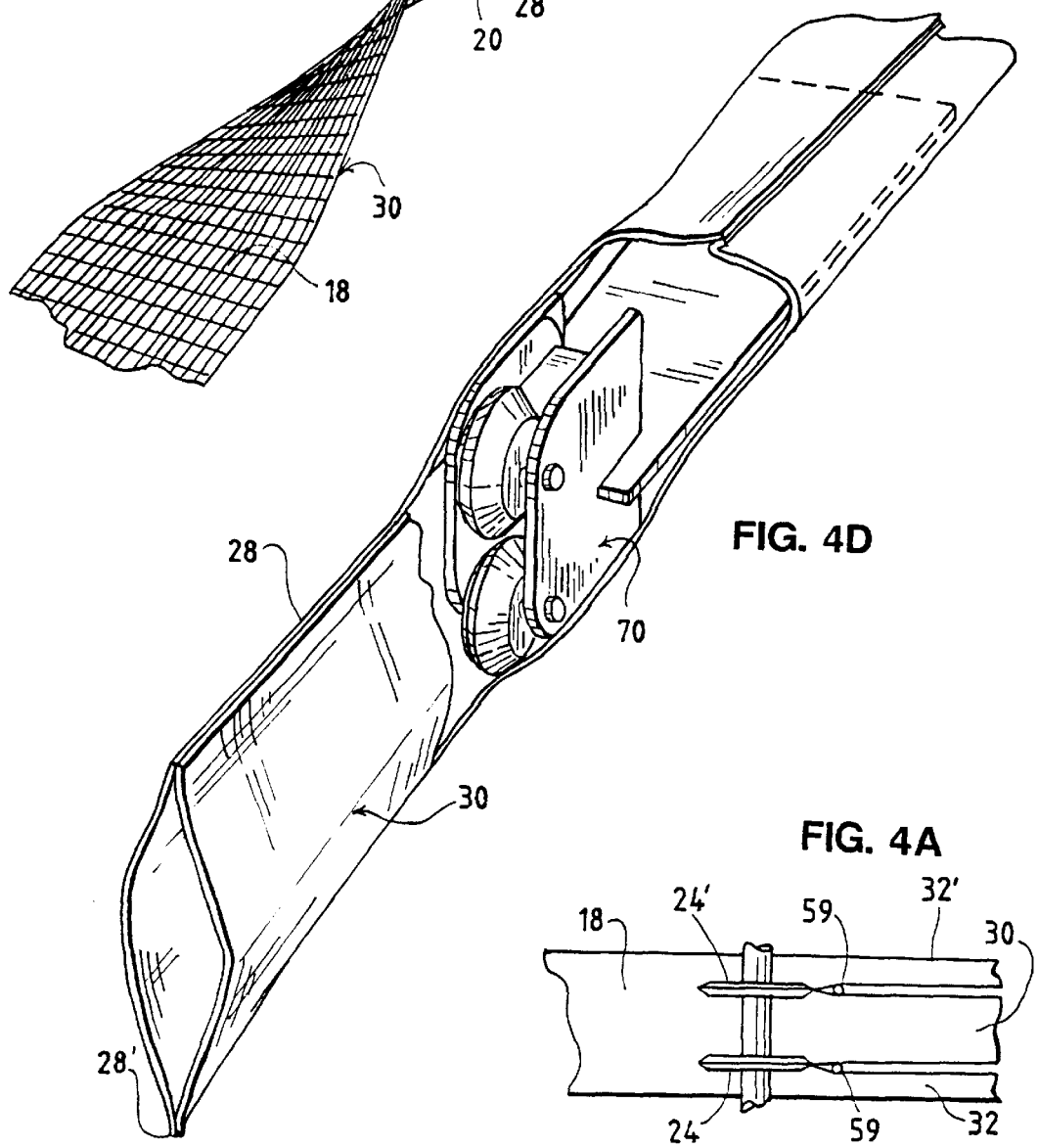

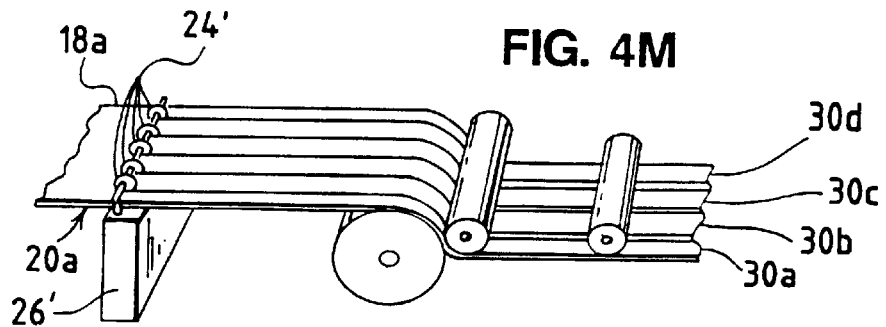
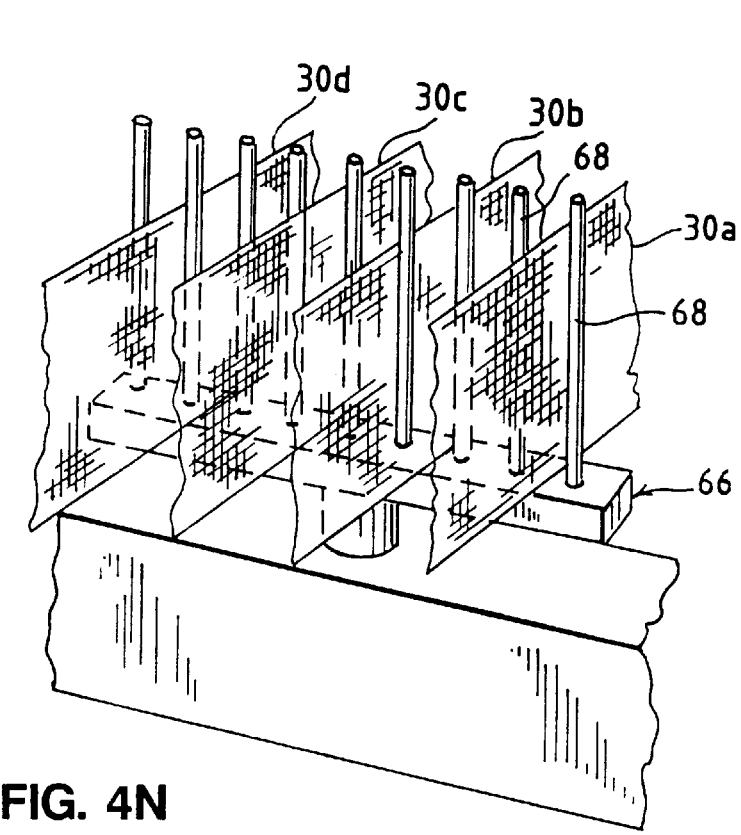
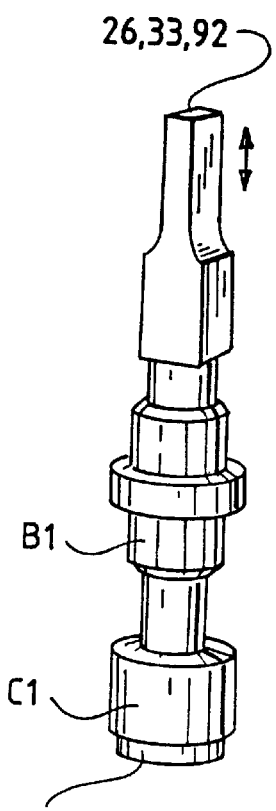

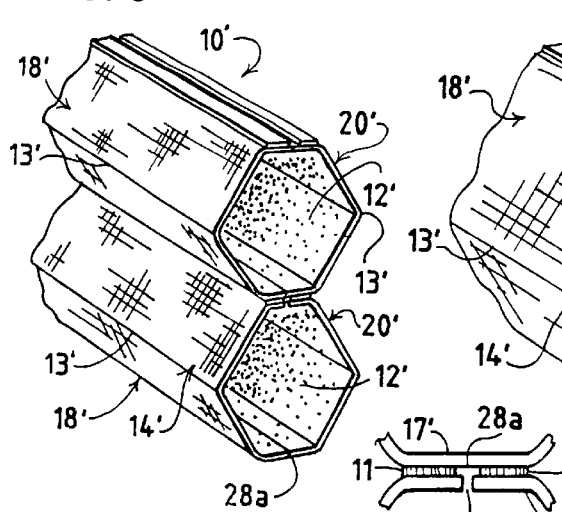
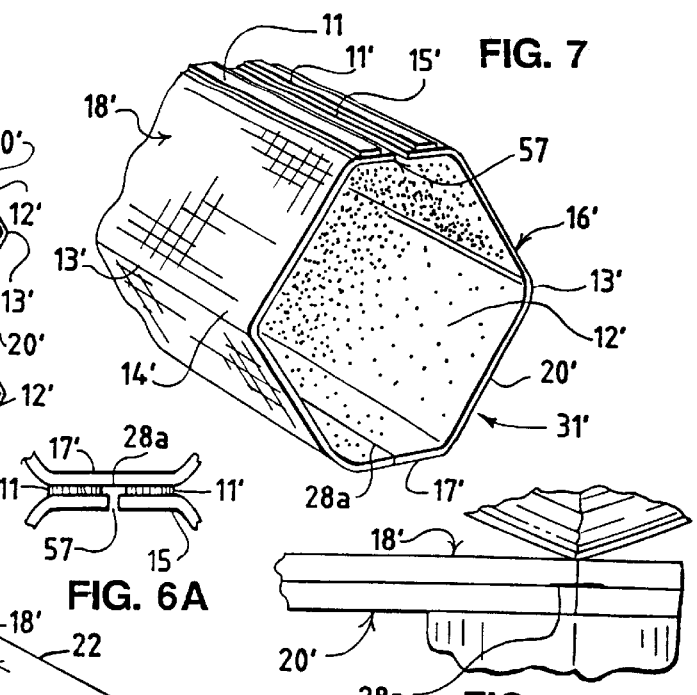
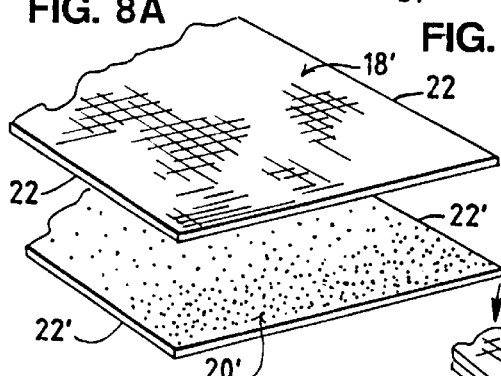
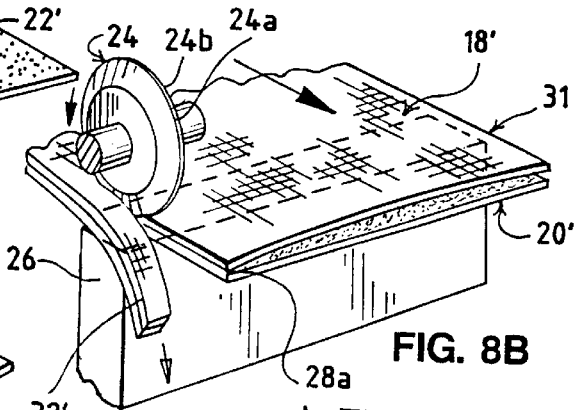
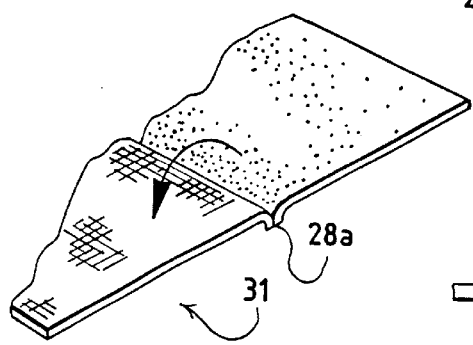
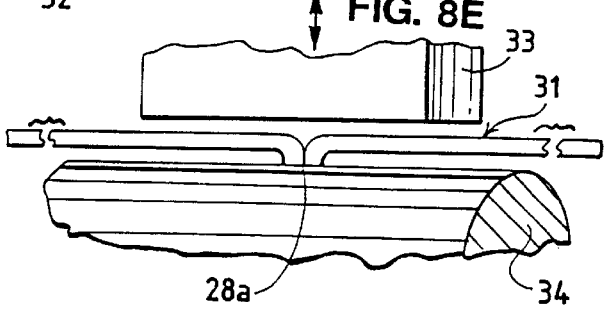
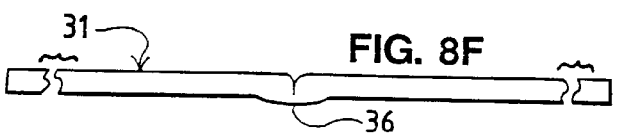

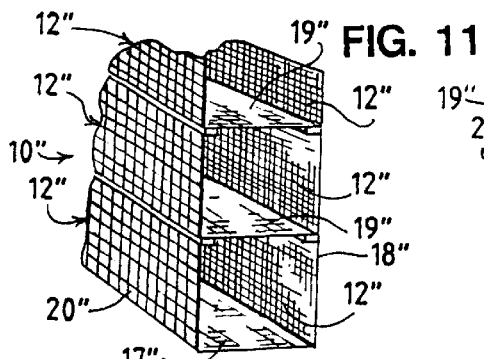
FIG. 11
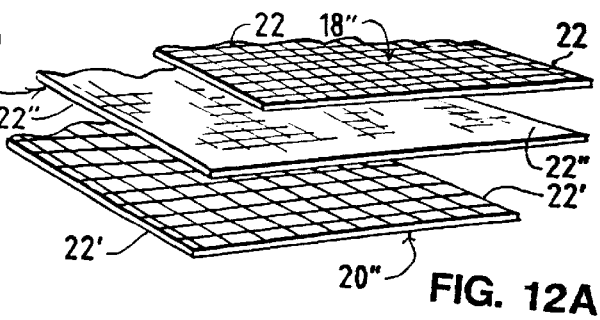
FIG. 12A
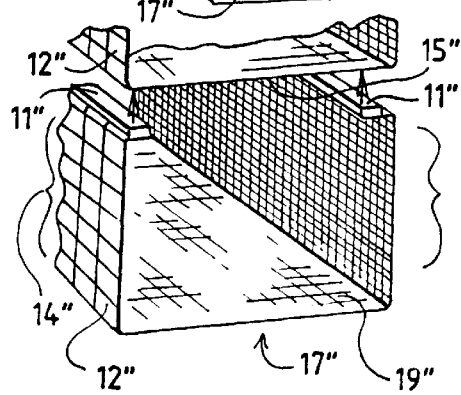
FIG. 11A
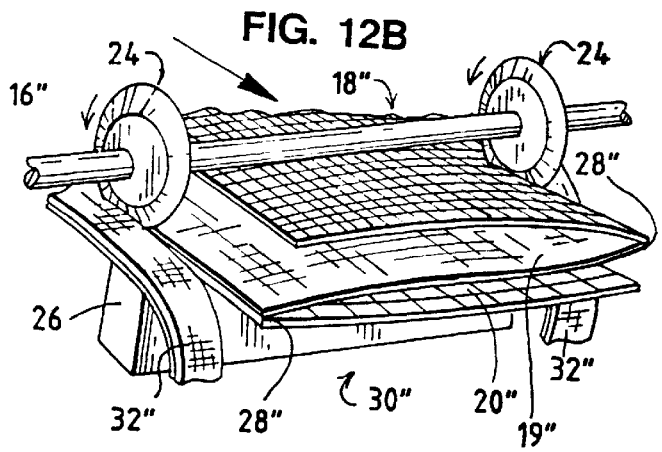
FIG. 12B
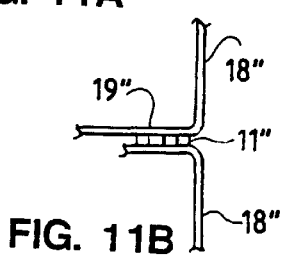
FIG. 11B
FIG. 12C
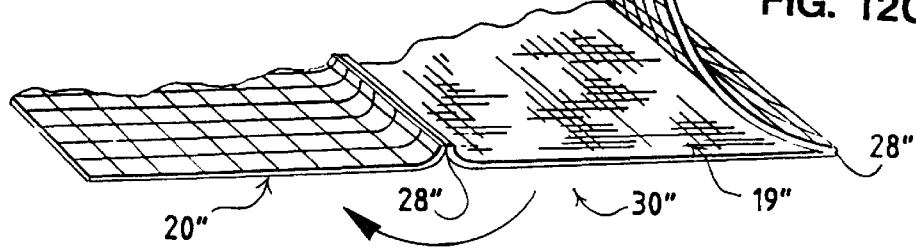
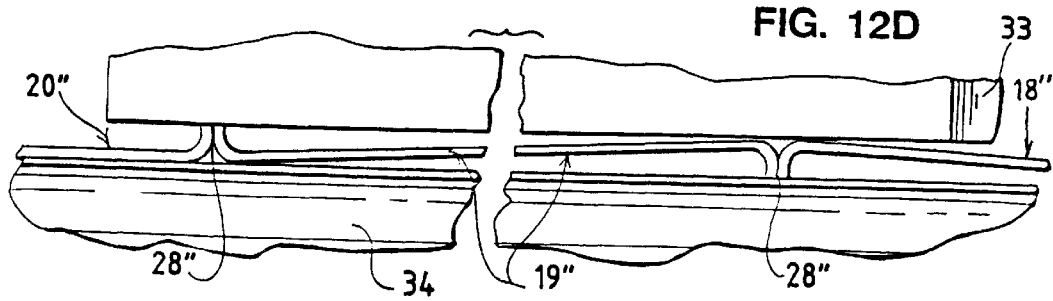
FIG. 12D

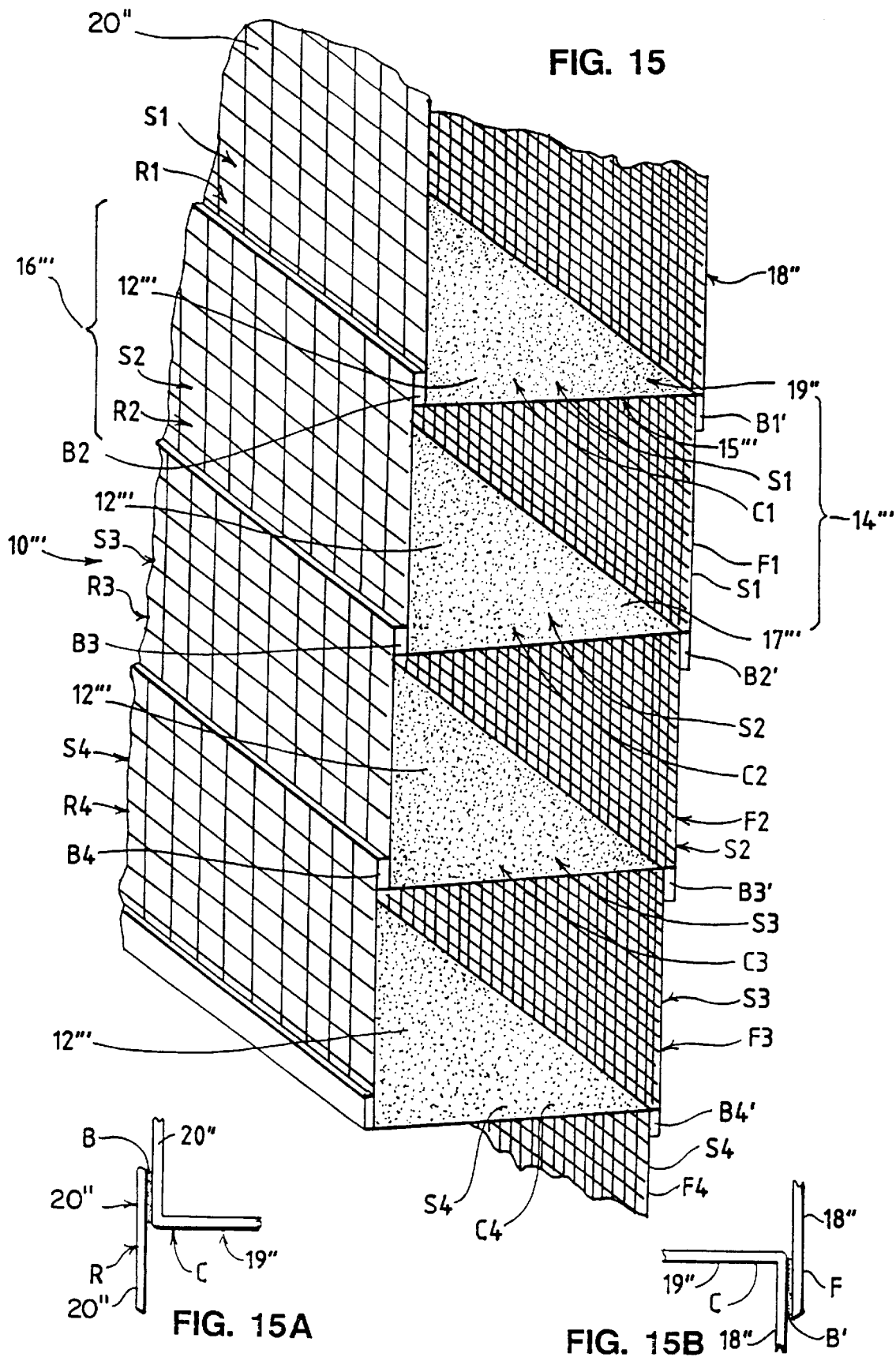

CELLULAR PANEL AND METHOD AND APPARATUS FOR MAKING THE SAME

This is a Continuation of U.S. patent application Ser. No. 08/880,569 filed Jun. 23, 1997 now U.S. Pat. No. 6,045,890 which is a Continuation of U.S. patent application Ser. No. 08/273,469 filed Jul. 11, 1994, abandoned.

BACKGROUND OF THE INVENTION

The present invention relates to cellular insulation panels. It has one of its most important applications as an insulating panel for covering windows or other openings. These panels most commonly comprise a plurality of tubular sections adhesively secured together. The panel can be oriented so that the tubular sections form a horizontally contractible and expandable panel which extends vertically, such as when covering a doorway or other similar openings. The panel more commonly is used with an orientation where the tabular sections form a vertically collapsible and expandable panel extending horizontally, such as when covering a window.

In window covering, the panel is mounted upon a headrail with pull cords extending down through holes in the panel to a bottom rail secured to the bottom of the panel. In some panel designs, each tubular section is a strip of usually thermoplastic woven or unwoven sheet material folded into an open-top tube. Each tube-forming strip is initially completely separate from the other tubular strips forming the panel and is laminated to the adjacent strips of the panel by bands of adhesive. The folds of each tubular section are usually sharp or set so that they appear as lines or bands which improve the aesthetic appearance of the panel. Such a panel is disclosed in Dutch Published Application No. 6706563 published Nov. 11, 1968 to Landa. In this Dutch publication, the cells have a rectangular, hexagonal or a pointed oval shape, depending on the width of the adhesive bands and the degree of expansion of the cells. If the adjacent tubular sections are secured together over wide securement bands and are fully expanded, the cells have a rectangular shape, as is shown in U.S. Pat. No. 4,019,554 granted on Apr. 26, 1977 to Rasmussen.

In another form of cellular panel construction, a pair of zig-zag shaped sheets of material are placed into confronting relation and secured together at the abutting fold points, to form diamond-shaped cells. This panel construction is disclosed in U.S. Pat. No. 2,201,356 granted Nov. 21, 1938 to Terrell.

The rear side of all these cellular panels, which interrupt the passage of light when covering a window, preferably have a color to reflect light. The front side of the panels, which face into the room involved, desirably have an appearance from a strictly aesthetic standpoint. In the panel design where each tubular section is made of a separate sheet of material folded into a tube, one half of the sheet may be printed or embossed before it is folded into a tubular shape, so that the portion of each sheet which faces the inside of the room is provided with the desired aesthetic appearance. The other half of each sheet, which faces towards the window has color to reflect light. If the initial sheet of material is already of a desired light color to reflect light, it can remain without any added coloring. If the sheet forming each tubular strip is made of an expensive material to give the front side of the panel an attractive appearance, the high cost of the portion of the same sheet which is to face the window is an undesired expense.

The panel design having diamond shaped cells, described previously, made from a pair of separate, confronting zig-zag shaped sheets does not have this problem as only the front sheet must be made of the more expensive material. However, this type of panel is less attractive to some purchasers than the panel having pointed oval, hexagonal or rectangular cells. Also, the method required for fabricating the panel made from zig-zag shaped sheets is less efficient and more difficult to control than the method used to make a panel of separate folded strips of material adhesively secured together.

The preferred cellular panel constructed and manufactured in accordance with the present invention overcomes these disadvantages. The panel can have cells of any desired shape, and can be made by a very efficient stacking process. In addition, only the front side of the panel requires a more expensive material, satisfying the aesthetic objectives of purchasers, and thus, the rear side can be made of a less expensive material, which is only required to reflect light, and aid in forming an insulating panel.

Many of the present features of the invention are applicable to another type of panel to be referred to as a light-controlling cellular panel, which is used to cover primarily windows. In this panel, the front vertical side of each horizontally extending cell is made of a sheer material, preferably of one mesh size, and the rear vertical side of each cell is made of a sheer material preferably of a different mesh size or mesh shape, to avoid a Moire effect. When the panel is in its light-passing state, the upper or lower horizontal wall of each cell is a horizontal opaque wall which, most desirably, is wider than the height of the cell. When one of the vertical sides of the panel is shifted upward or downward with respect to the other vertical side of the panel, the opaque walls are pivoted into substantially vertical positions where they completely overlap, to obstruct the passage of light through the panel.

Most of the methods previously used to fabricate this type of light-controlling panel did not permit the ready manufacture of any desired width of the panel. The commercial forms of this panel have been usually constructed from two horizontally spaced confronting unfolded vertical sheets of sheer material, which respectively formed the complete front and rear sides of the panel. Opaque strips of material are adhesively secured at spaced vertical points between the front and rear sheer sheets of the panel. The cells of this panel have a rectangular shape. As will later be described, the present invention provides a very efficient and effective means for manufacturing a panel having a similar appearance to this panel, but is constructed much differently. The present invention is made from a multiplicity of separate identical strips of material of any desired length, cut from a continuous web and laminated by an efficient strip stacking process where the panel can have any desired length. The panel can then be made into any width using a highly efficient stacking process.

SUMMARY OF THE INVENTION

It is preferred in all forms of the invention that the cellular panel be made by a method and with apparatus that initially is either a continuous tubular or flat web formed from two or more narrow, continuous substrate sheets or webs of completely different material which form the front and the rear walls of the cellular panel to be made therefrom. The continuous substrate sheets, when made of a thermoplastic material, are secured together, preferably by sonically welding their abutting longitudinal margins. This permits efficient mass production of panels of various constructions by cutting strips from the web and laminating the strips together in the various ways to be described.

One form of the invention forms a panel which is not light-controlling. The panels are made at a high-speed, on one or more production lines by feeding a pair of basic webs, or substrate sheets, in superimposed relation past one or more sonic welders. Where one sonic welder is used to make such a panel, the two continuous substrate sheets are welded together only along one of their longitudinal margins. The resulting two-substrate web is first unfolded to form a flat web. The flat web is fed, immediately and sequentially to folding, adhesive-applying, web cutting and stacking apparatus, or to a different production line when wound on a take-up reel and later unwound therefrom. The open tubular segments of the web formed by the folding apparatus produce adhesive connected tubular sections of the completed panel.

To avoid unfolding and folding the web, the web is formed by a pair of sonic welders which weld both aligned longitudinal margins of the superimposed continuous substrate sheets, so that the two-substrate web formed thereby forms a flat, closed tubular web; the welds are at the outer edges of the web. The flat, closed tubular web is fed to a web reforming apparatus. This apparatus first opens and then reflattens the web, so that the welds are transitioned to the flat top and bottom faces of the web. This reformed web is then subsequently fed to the adhesive-applying, web-cutting and stacking apparatus.

This web-reforming apparatus reflattens the tubular web in a plane preferably less than 90° from the original plane of the flat tubular web. This brings the welded margins of the flat tubular web from the outer edges of the flat web to laterally offset positions on the flat top and bottom faces of the web. As longitudinally-spaced segments of this flattened web become the separate tubular sections of the completed panel, the welded portions of these tubular sections are located along the confronting faces thereof, which are not visible at the front or rear side of the completed panel. The two different appearing substrate sheets are then only visible respectively on the opposite sides of the panel. While in accordance with a broad aspect of the invention, the welded portions need not be laterally offset, it is desirable because the offset reduces the thickness of the panel when it is raised into a collapsed condition at the top of a window. In all applications of the present invention where the substrate sheets are sonically welded along their superimposed abutting margins, it is desirable to flatten the welded portions of the substrate sheets. This process assures only a slight bulging of the substrate material therein, further reducing the thickness of the panel when in its collapsed configuration.

The welding and flattening of the substrate sheets is preferably achieved by a sonically welding method similar in some respects to that disclosed in U.S. Pat. No. 4,177,100 granted on Dec. 4, 1979 to Pennington. This patent discloses the use of heat and pressure to first secure together the folded trailing edge of a stationary thermoplastic sheet to the superimposed folded leading edge of a following stationary sheet. The welded superimposed stationary sheets are then unfolded and flattened by application of heat and pressure, while the sheets are stretched to pull the welded sheets apart. In the present invention, it is not necessary to pull the welded sheets apart during the application of the heat and pressure. In the practice of a preferred form of the present invention, the heat and pressure used to flatten the welds are applied by using sonic welding apparatus designed to perform only a weld-flattening operation.

In these two methods of making cellular panels, the individual tubular sections which form the completed panel can be formed from strips traversely cut from an adhesive coated web either before or after they are stacked. The latter stacking method is disclosed in U.S. Pat. No. 4,450,027 to Colson where, initially, an adhesive coated open tubular web, which is not a sonically-welded tubular web of different substrate sheets as just described, is spirally wound on a flat, rotating stacker. The stacker forms a flattened spiral winding of the web material, where the layers are adhesively secured together. The ends of this flat spiral winding are then severed from the rest of the stack of severed layers of material to separate and divide the severed web into separate, adhesively-secured together tubular sections forming a continuous cellular panel. However, it is preferred that the adhesively-coated, multi-substrate web be first cut into strips and then stacked in a manner like that disclosed in U.S. Pat. No. 3,713,914 to Clark et al.

When forming a light-controlling panel, the initial continuous web is constructed preferably of three, differently-appearing substrate sheets welded together at their confronting longitudinal margins. The central substrate sheet is made from an opaque material. The other two substrate sheets positioned on opposite sides of the opaque central substrate sheet, are made from a narrower sheet of sheer material preferably of different mesh size or mesh shape, to eliminate a Moire effect. The three-substrate web is preferably made by positioning one of the narrower sheer substrate sheets over and along one of the side margins of the wider opaque substrate sheet and positioning the other narrower sheer substrate sheet beneath the wider opaque web along the opposite side margin thereof. These substrate sheets so positioned are moved past a pair of sonic welders positioned along the opposite longitudinal margins of the substrate sheets, where each welder welds only the two layers of sheet material located thereat. The resulting three-substrate web is then unfolded so that the completed panel can be made by one of two methods.

In both of these methods, the three-substrate web is initially cut into strips of equal length. In another method, before the web is so cut, it is folded into an open tubular web by folding the opposite longitudinal margins of the outer sheer substrate sheets of the web over the central opaque substrate sheet of the web. A pair of adhesive bands are then applied to the top surfaces of the folded-over portions of the tubular web so that the tubular strips cut from the web are adhered together when stacked over a width equal to the width of the opaque substrate sheets thereof. The stacked, adhered strips are cut to size to form a continuous cellular panel of desired length.

When the panel is oriented so that the tubular sections or cells of the panel extend horizontally and are in vertically-spaced relation, the front wall of each cell is formed by a front vertical sheer substrate sheet of one of the tubular strips, the rear wall of each cell is formed by a rear vertical sheer substrate sheet of the same tubular strip, the bottom wall of each cell is formed by a horizontal center opaque substrate sheet of the same tubular strip and the top horizontal wall of each cell includes the folded end portions of the same tubular strip and the opaque substrate sheet of the strip above it.

When the substrate sheets which form the front or rear sides of the panel are shifted up or down with respect to each other, the initially horizontal opaque substrate sheets of the various laminated strips are shifted from a horizontal position where light passes through the panel to an inclined vertical position where the opaque substrate sheets of adjacent strips overlap, to stop the passage of light through the panel.

Another method for Fabricating a light-controlling cellular panel eliminates the folding of the initially flat three-substrate webs. Before the flat web is cut into strips, spaced bands of adhesive are applied to the top surface of the web in a pattern which effects a special strip laminating pattern. The adhesive-coated flat web is then transversely cut into flat strips of equal length. The strips are laminated together by sequentially laterally shifting the strips from their original aligned longitudinally spaced positions. Each laterally shifted strip is next laminated so that the outer longitudinal margin of one of the outermost light-passing substrate sheets of each strip is adhered to the strip cut before it at the innermost longitudinal margin of the corresponding light-passing substrate sheet thereof, and the inner longitudinal margin of the other outermost light-passing substrate sheet of the former strip is adhered to the latter previously cut strip at the outer longitudinal margin of the corresponding outer substrate sheet. The resulting panel formed from the laterally-shifted laminated strips, when expanded, places the light-passing substrate sheets in positions where one of the light-passing substrate sheets of each strip forms a vertical front wall of an expanded tubular section of the panel, the other light-passing substrate sheet of the same strip forms a vertical rear wall of the adjacent expanded tubular section of the panel, and the opaque substrate sheet of that strip forms the horizontal top or bottom wall in common between adjacent cells of the panel.

When the light-passing substrate sheets on one side of the panel are shifted vertically relative to the light-passing substrate sheets on the opposite side thereof, the opaque central substrate sheet of each laminated strip of the panel is pivoted from its initial horizontal position where light can pass through the panel to a position where the opaque substrate sheets of adjacent cells of the panel overlap one another to obstruct the passage of light through the panel.

Other advantages and features of the invention will become apparent upon making reference to the specification, claims, and drawings to follow.

DESCRIPTION OF DRAWINGS

FIG. 1 is a perspective view of two adjacent tubular sections of the preferred panel of the present invention which is adapted for applications where the panel covers a window in its normal use and is raisable to the top of a window when not in use;

FIG. 1A is a fragmentary, enlarged vertical sectional view through the laminated portions of two adjacent tubular sections of the panel and shows spaced adhesive bands which secure together the adjacent wall sections of these tubular sections of the panel;

FIG. 2 is a larger perspective view of one of the tubular sections shown in FIG. 1, specifically showing the adhesive bands on the top of each tubular section;

FIGS. 3A–3F respectively show the different operations performed on a production line upon a pair of superimposed continuous substrate sheets of different material to form a multi-substrate sheet web which is wound upon a reel and then subsequently unwound and applied to the second section of a production line, shown in block form in FIG. 5, where the web is coated with adhesive and cut into strips which are then laminated to form a continuous cellular panel;

FIGS. 4A and 4B disclose slit/weld sensor pins which detect whether the slit/weld anvils are operating properly;

FIGS. 4C–4H disclose various views of the web reforming stations of the apparatus of FIG. 4', where an initially formed flattened tubular web is reformed into a tubular web flattened in a different plane;

FIGS. 4M and 4N show a modification of the production line of FIG. 4, where a number of multi-substrate webs are simultaneously formed on a number of production lines formed of common elements as in FIGS. 4 and 4';

FIG. 4O shows the different elements of a sonic horn used throughout the production lines to be described hereafter;

FIG. 6 is a perspective view of two adjacent tubular sections of a panel where each tubular section is an open top tube for a panel which covers a window in its normal use and is raisable to the top of a window when not in use;

FIG. 6A is a fragmentary enlarged vertical sectional view through the laminated portions of two adjacent tubular sections of the panel of FIG. 6 and shows spaced adhesive bands which secure together the adjacent wall sections of the tubular sections of the panel;

FIG. 7 is a larger perspective view of one of the tubular sections shown in FIG. 6, specifically showing the adhesive bands on the top of each tubular section;

FIGS. 8A–8F respectively show the different operations performed on a production line upon a pair of superimposed continuous substrate sheets of different material to form a multi-substrate sheet web which is wound upon a reel and then subsequently unwound and applied to the second section of a production line where the web is folded, coated with adhesive and cut into strips which are then laminated to form the continuous cellular panel shown in FIG. 6;

FIG. 11 is a perspective view of three adjacent cells of yet another embodiment of the present invention which is a light-controlling cellular panel and is adapted to applications where the front and rear sides of the panel are movable vertically relative to one another from the light-passing position of FIG. 11 to one (not shown) where light passage through the panel is blocked;

FIGS. 11A–11B more clearly show the spaced bands of adhesive which secure together the adjacent cells or tubular sections of FIG. 11;

FIGS. 12A–12D respectively show the different operations performed on a production line upon three superimposed continuous substrate sheets of different material to form a multi-substrate sheet web which is to form a light-controlling cellular web which is wound upon a reel and then subsequently unwound and applied to the second section of a production line shown in block form in FIG. 14, where the web is folded, coated with adhesive, and cut into strips which are then laminated to form the continuous cellular panel of FIGS. 11 and 12;

FIG. 15 is a perspective view of a plurality of cells of another light-controlling panel embodiment of the present invention;

FIGS. 15A–15B are fragmentary enlarged views of the panel of FIG. 15 showing the adhesive bands connecting adjacent multi-substrate strips which form the cells of the panel;

DETAILED DESCRIPTION OF THE PRESENT INVENTION

The Embodiment of FIGS. 1–5

Figure 4:
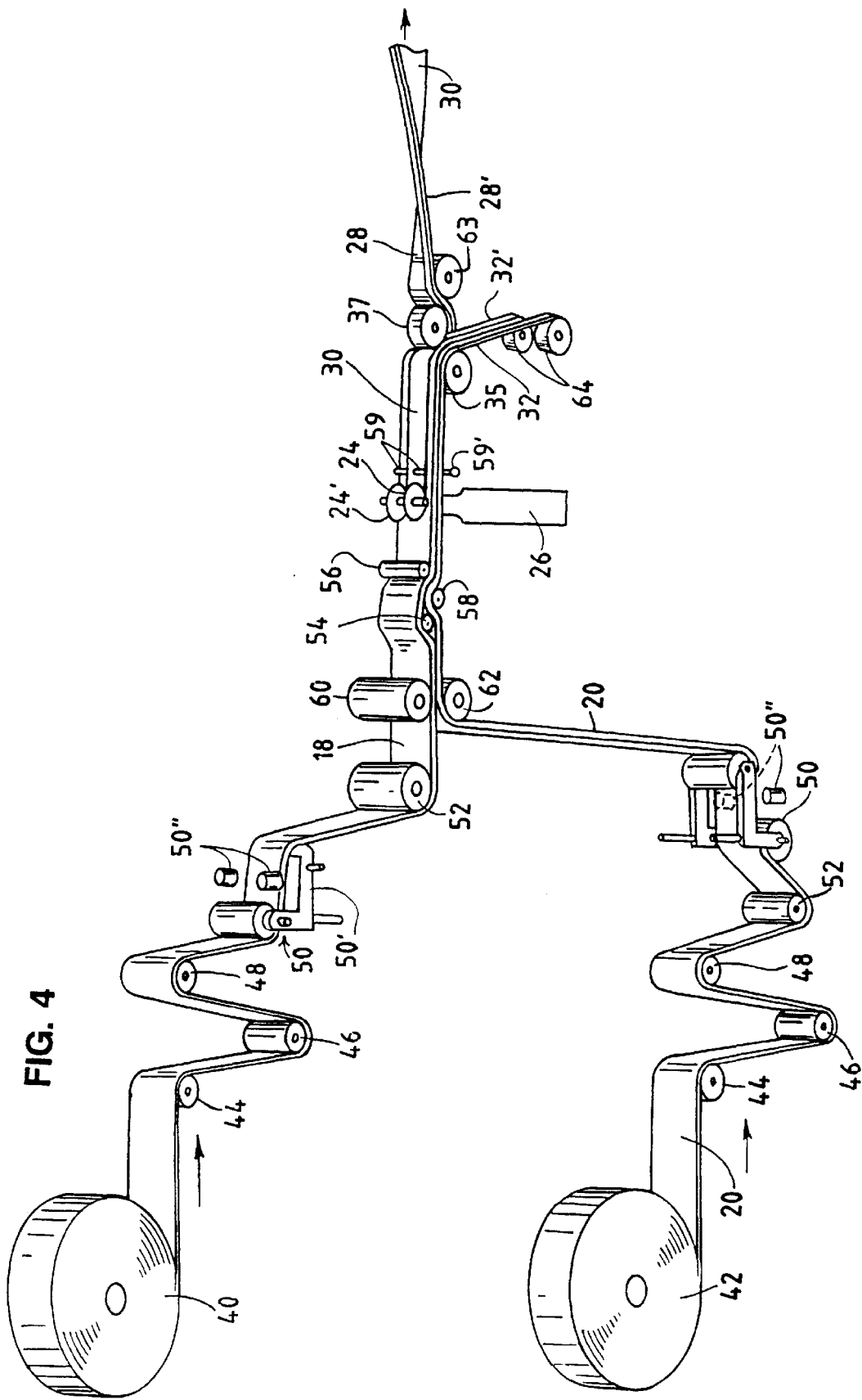
FIGS. 4 and 4' taken together show an exemplary production line for performing the various steps illustrated in FIGS. 3A–3F.
Figure 4:
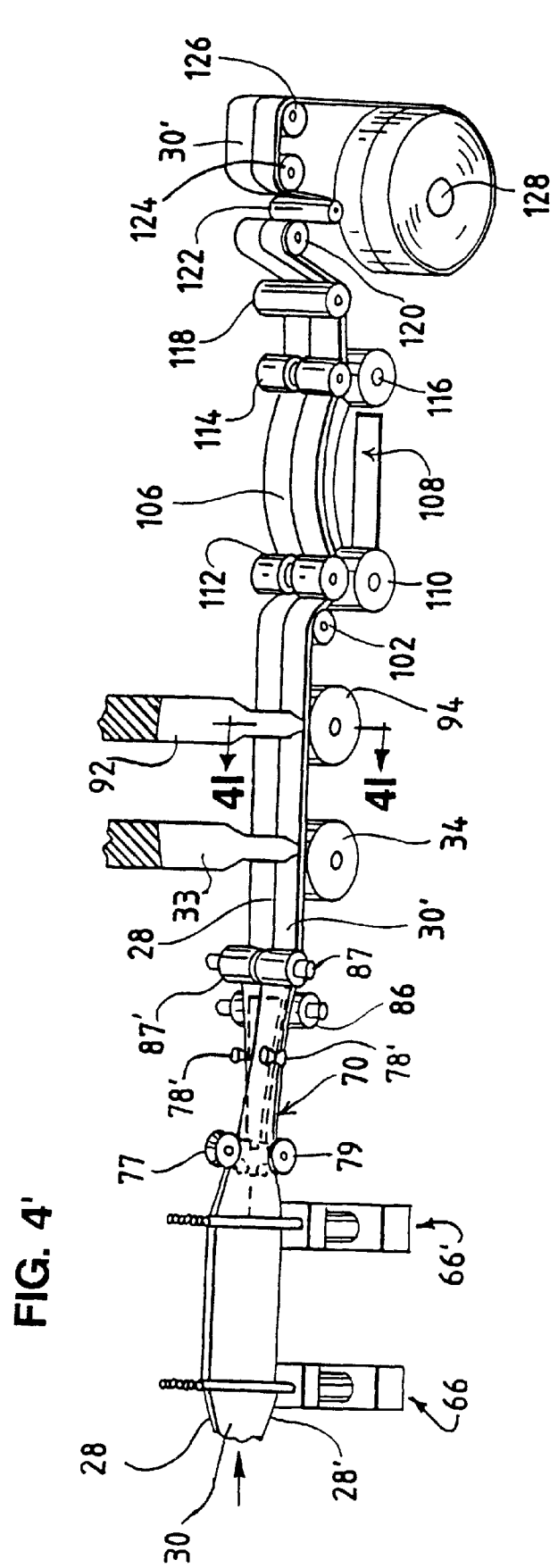

While this invention is susceptible of many different forms, there is shown in the drawings and will herein be described in detail various preferred embodiments of the invention, with the understanding that the present disclosure is to be considered as an exemplification of the broad principles of the invention and is not intended to limit the broad aspects of the invention to the embodiments illustrated. The various different details of the various embodiments of the invention are, in some cases, due to their different applications and, in other cases, due to progressive improvements to earlier developed embodiments.

Referring now to the drawings, FIG. 1 shows a portion of a non-light controlling closed tube cellular panel 10 in its expanded state, formed from laminated horizontally elongated vertically aligned tubular sections or cells 12. This is the most preferred panel embodiment of the present invention where the panel is not light-controlling as are other panels to be described. FIG. 2 shows a single cell or tubular section 12 of the cellular panel 10. The cell 12 has a front wall portion 14 made from a first continuous thermoplastic substrate sheet 18, having a desired aesthetic appearance, and a rear wall portion 16 made from a second continuous thermoplastic substrate sheet 20 of about the same thickness, length and width as the first sheet 18. The second sheet 20 is made of different appearing, preferably much less expensive, light-reflecting material from the substrate sheet 18. The cell 12 also has a top wall portion 15 and a bottom wall portion 17. Each tubular section 12 is laminated to the next adjacent tubular section 12 by spaced bands 11–11' of adhesive which are spaced apart to provide an adhesive-free band 15a centered on the top wall portion 15 of each cell 12 to receive a drill for drilling pull cord-receiving holes (not shown). Folds 13–13', shown in FIG. 1A, are formed in the centers of the sheets 18 and 20, so that when the tubular sections 12 are expanded by the weight of a bottom rail (not shown) and the weight of the panel itself above the rail, the cells have a hexagonal shape.

The cell 12 is initially formed by first superimposing the two separate continuous substrate sheets 13,20 as shown in FIG. 3A. The superimposed substrate sheets 18 and 20 have superimposed longitudinal marginal portions adjacent their longitudinal edges 22,22 and 22',22' which are secured together, most preferably by sonic welding. As shown in FIG. 3B, circular pointed slit/weld anvils 24,24' are positioned slightly inward of the aligned pairs of longitudinal edges 22,22' of the two substrate sheets 18,20. The anvils 24,24' may be driven by a pulley system (not shown) or other drive means or can be stationary. Driven rotary anvils are preferred to lessen the wear on the anvils. The periphery of each anvil 24,24' is tapered on each side 24b,24b' toward the pointed edge 24a,24a' thereof. A common ultrasonic horn 26 having a flat end face 26a is positioned under the second substrate sheet 20 and extends at least the entire width of the two substrate sheets 18,20. As the two substrate sheets 18,20 pass between the slit/weld anvils 24,24' and the common ultrasonic horn 26, the longitudinal marginal portions of the sheets inwardly of the pointed edges 24a,24a' of the anvils 24,24' are welded together by the ultrasonic horn 26 vibrating the two substrate sheets 18,20 against the slit/weld anvils 24,24'. Narrow continuous longitudinal welded portions 28,28' are formed at the inside faces 24b, 24b of the slit/weld anvils 24,24'. The welded portions 28,28' have a width of about the thickness of each of the substrate sheets 18,20. FIG. 3C is an enlarged view of a weld formed by the process shown in FIG. 3B and shows the pointed edge 24a' of the anvil 24', the superimposed substrate sheets 18,20, and a portion of the ultrasonic horn 26 positioned therebelow.

In addition to sonically welding the superimposed substrate sheets 18,20 together, the slit/weld anvils 24,24' also slit through the superimposed substrate sheets 13,20 at the location of the anvil pointed edges 24a,24a'. This produces selvedge portions 32,32' of the superimposed substrate sheets 18,20 adjacent the pointed edge 24a,24a' of each slit/weld anvil 24,24' which are collected in a process to be described in more detail.

The welding process described forms a continuous, flat, multi-substrate tubular web 30 (FIG. 3B) in a horizontal plane, with the different appearing substrate sheets 18,20 constituting the opposite flat sides thereof. The panel 10 is formed from longitudinally spaced segments cut from this web 30 and laminated preferably in a manner to be described. The web 30 shown is reformed so that a flat tubular web 30' (FIG. 3F) is formed having the welded portions 28,28' thereof on the top and bottom of the opposite flat sides of the reformed flattened web 30'. To this end, the tubular web 30 is first guided from a horizontal plane to a vertical plane (FIG. 3D). The flat tubular web 30 is next opened and then flattened in a plane approaching a right angle to the original plane of the flat web 30 to bring the welded portions 28–28' to the flat top and bottom faces of the reformed tubular web 30', but laterally spaced in opposite directions from the center line of the web so the welded portions 28–28' webs are not in alignment, as shown in FIG. 3E. As there shown, the reformation of the web 30 causes the welded portions 28–28' to project above and below the top and bottom faces of the reformed web 30'. It is desirable that the reformed tubular web 30' have a similar thickness throughout; therefore, the projecting welded portions 28–28' of the tubular web 30' are flattened to produce a tubular web 30 with similar thickness throughout as shown in FIG. 3F.

FIG. 3E illustrates this weld flattening process which utilizes a weld flattening ultrasonic horn 33, similar to the welding ultrasonic horn 26 shown in FIG. 3B, but positioned above the reformed tubular web 30', and a preferably driven cylindrical rotating anvil 34 positioned below the reformed tubular web 30'. As the tubular web 30' masses between the web flattening ultrasonic horn 33 and the cylindrical rotating anvil 34, the welded portions 28,28' of the tubular web 30' are flattened by the pressure applied by the flattening ultrasonic horn 33 vibrating the tubular web 30' over the cylindrical rotating anvil 34. The opposite top and bottom layers of the tubular web 30' are not welded together because the conditions of the process are controlled to avoid a welding operation. Exemplary weld flattening conditions are disclosed in the process specification to follow.

FIG. 3F shows the reformed tubular web 30' with the welded portions 28,28' out of alignment and substantially flattened. As shown, slight bulges 36,36' remain in the tubular web 30' at the welded portions 28–28'.

FIGS. 4 and 4' show a full production line for manufacturing the closed reformed tubular web 30' made of two continuous substrate sheets 18,20 of differently appearing material. FIG. 4' is a continuation of the line shown in FIG. 4. Narrow webs of the two continuous substrate sheets 18,20 wound on driven supply reels 40,42 are unwound by the pulling force of drive and nip rollers 35,37. The substrate sheets 18,20 pass through a series of rollers designed to maintain tension in the substrate sheets 18,20. To this end, the substrate sheets 18,20 first respectively pass over idler rollers 44, and down under conventional dancer tensioning rollers 46 which are mounted on arms (not shown) which move up and down to keep a constant tension in the continuous substrate sheets 18,20. The tendency of these and other dancing rollers, to be described, to move up and down is opposed by a feedback control system which controls the driving speed of the supply reels 40,42 and take-up reel 128 upon which the completed web 30 is wound. The substrate sheets 18,20 continue over second idler rollers 48. After the substrate sheets 18,20 pass over idler rollers 48, the first substrate sheet 18 passes through a conventional photo-cell controlled edge guidance roller assembly 50 which keeps the sheet in longitudinal alignment. The substrate sheet 18 next passes under a third idler roller 52 and to a pair of idler rollers 60–62. The roller assembly 50 includes a support frame 50' mounted for pivotal movement about a vertical axis and photo-cells 50" sensing the positions of the edges of the substrate sheet 18. After passing over the second idler roller 48, the second substrate sheet 20 passes under the third idler roller 52 and through a conventional photo-cell controlled edge guidance roller assembly 50, like the assembly 50 just described. The substrate sheet 20 then passes up to the pair of idler rollers 60,62. At the idler rollers 60,62, the superimposed substrate sheets 18,20 have their longitudinal margins or edges aligned.

The two superimposed substrate sheets 18,20 next pass through adjustable longitudinally-spaced non-rotating shafts 54,56,58, which are vertically adjustable. The shafts 54,56 adjust the elevation of the two superimposed substrate sheets 18,20. The shaft 58 is positioned below shafts 54,56 and is vertically adjustable to control tension in the substrate sheets 18,20 to eliminate any wrinkles at the welding assembly. The first substrate sheet 18 passes over the shaft 54 and between the shafts 56 and 58. The second substrate sheet passes under the shaft 54 and between the two shafts 56 and 58.

The superimposed substrate sheets 18,20 next pass between the common ultrasonic horn 26 and the rotating or stationary slit/weld anvils 24,24', where the sheets' opposite longitudinal edges 22,22' are welded together, as previously described with respect to FIGS. 3B–3C. This, as noted before, forms a continuous tubular web 30 of differently appearing substrate sheets 18,20 superimposed and welded together in the horizontal plane. The welding process carried out by the ultrasonic horn 26 and rotating slit/weld anvils 24,24' produce selvedge portions 32,32' at the longitudinal edges 22,22' of the tubular web 30. The tubular web 30 and selvedge portions 32,32' then pass through a pair of slit sensor pins 59,59.

The pair of slit sensor pins 59,59 are further shown in FIGS. 4A and 4B and extend upward from a common controlled shaft 59'. The sensor pins 59,59 pass between the selvedge portions 32,32' and the welded portions 28,28' of the substrate sheet 18,20 before the same reaches the rollers 35,37. The sensor pins 59,59 detect whether the slit/weld anvils 24,24' have completely slit through the substrate sheets 18,20 which would normally indicate that the slit/weld anvils 24,24' are operating properly. The slit/weld anvils will wear over time and eventually fail to completely slit through the substrate sheets 18,20. If this occurs, the portion of the substrate sheets 18,20 not slit engages the slit sensor pins 59,59, which will rotate the common controlled shaft 59' forward. As shown in FIG. 4B, this forward rotation of the shaft 59' is connected to a switch means 61 which shuts down the production line so that the worn, defective slit-weld anvil can replaced.

The tubular web 30 and selvedge portions 32,32' next pass between a driven bottom roller 35 and a top nip roller 37, which pull the substrate sheets 18,20 through the welding assembly. The selvedge portions are wound on take-up reel 64. The tubular web 30 then passes over an idler roller 63 which restores the elevation of the tubular web 30 to the elevation occupied by the tubular web 30 at the welding apparatus.

After the welding, but before the weld flattening operation, as previously described, web-reforming means are provided which transition the welded portions 28,28' of the tubular web 30 from the outer edges of the tubular web 30 to positions on top and bottom of a flat reformed tubular web 30', as shown in FIG. 3E. This transition of the welded portions 28,28' preferably takes place in the specific manner illustrated in FIGS. 4C–4H.

The tubular web 30 lies in a horizontal plane after exiting the ultrasonic horn 26 and slit/weld anvil 24,24' assembly and is twisted into a vertical plane by passing through one of the vertical slots 67 formed between a first pair of spaced vertical rods 68,68 of a first comb-like structure 66 shown in FIGS. 4' and 4C. The vertical, horizontally spaced rods 68 are mounted on a base 66 supported on a post 67. The tubular web 30 then passes through a second comb-like structure 66' identical to the first comb-like structure 66. Using two comb-like structures assures the tubular web 30 is kept in a vertical plane before it enters the next steps of the process; it also reduces stress on the web 30.

Figure 4E:
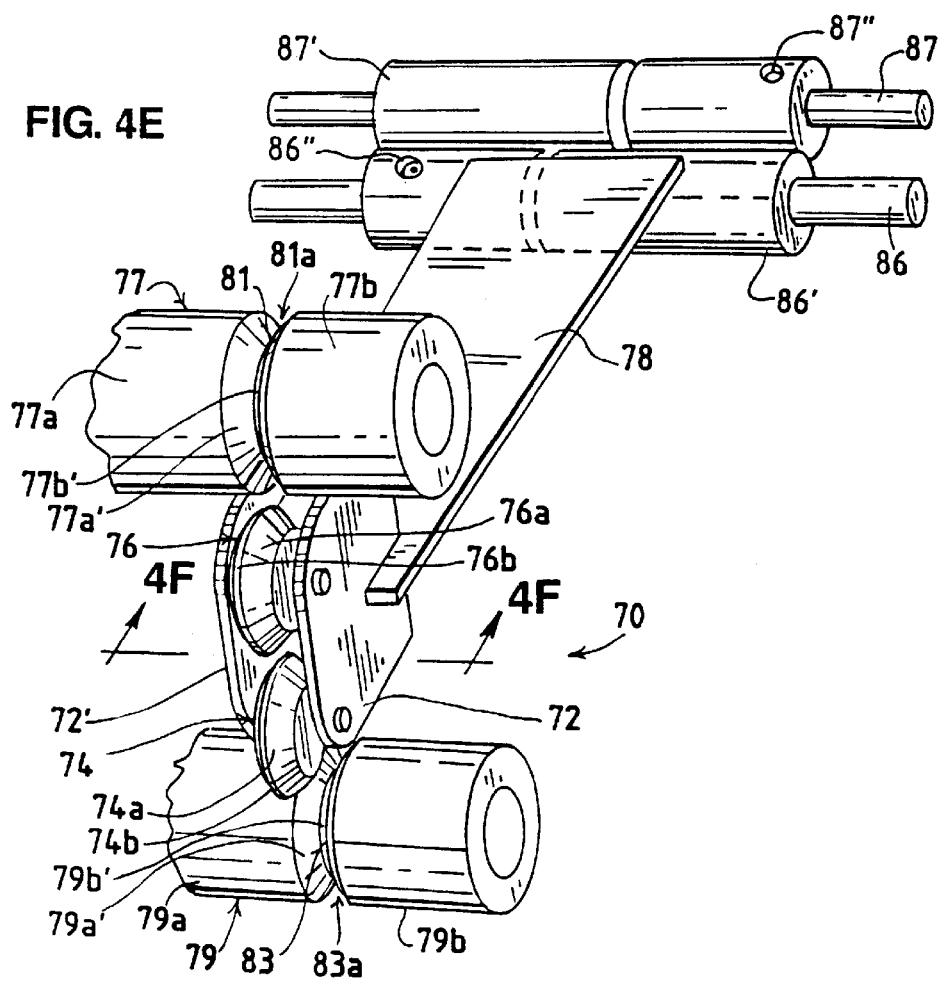
Figure 4F:
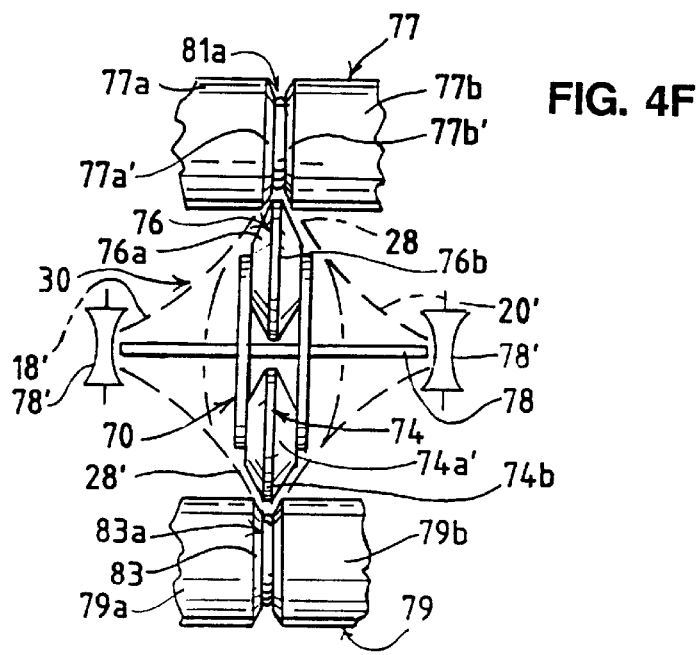

The vertically oriented tubular web 30 is then expanded to receive an insert structure 70 illustrated in greater detail in FIGS. 4D–4G. As seen in FIG. 4D, the insert structure 70 floats within and keeps the tubular web 30 open, with the welds 28,28' at the top and bottom of the web 30. The tubular web 30 is then re-flattened in a plane slightly less than 90 degrees from the plane of the interfaces between the substrate sheets 18,20 when they were originally welded together. FIG. 4E shows the insert structure 70 including a pair of horizontally spaced vertical support plates 72,72' between which are rotatably mounted two narrow, vertically spaced rollers 74,76 having outwardly tapering peripheral portions 74a,76a ending at peripheral flat crown portions 74b,76b. A horizontal, rearwardly tapering guidance plate 78 is secured to the vertical support plates 72,72' and extends forwardly therefrom. The tapered guidance plate 78 rests on a stationary shaft 86 for support. FIG. 4F illustrates in dashed lines a cross-section of the tubular web 30 passing around the insert structure 70, with the flat crown portions 74b,76b of the roller peripheries engaging and expanding the open web, so that the welded portions 28,28' at the top and bottom of the vertically oriented tubular web 30 ride along the flat crown portions 74b,76b.

To prevent the guidance plate 78 from shifting in a lateral direction, a pair of rotatable plate-holding members 78' are positioned on opposite sides of the guidance plate 78. The members 78' rotate while pressing against the outer sides of the web against the edge of the guidance plate 78 as shown in FIGS. 4' and 4F.

Figure 4G:
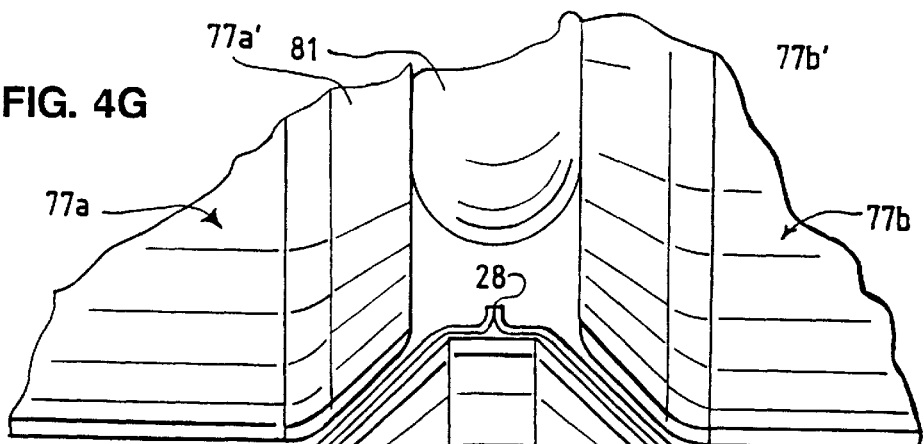

The expanded web 30 is then kept expanded in a horizontal plane by the guidance plate 78 and in a vertical plane by the flat crown portions 74b,76b of rollers 74,76. A pair of fixed cylindrical outer guide members 77,79 are provided with tapered slotted portions 81a,83a which closely but in spaced relation confront the forwardly facing sides of the rollers 74,76 respectively at the upper and lower margins thereof. The outer guide members 77,79 are formed by a pair of bearings 77a–b, 79a–b with tapered confronting surfaces 77a'–b' and 79a'–b' which are spaced apart by O-rings 81,83 and define grooves 81a,83a with the tapered surfaces 77a'–b, 79a'–b' closely confronting the flat crown portions 74a'–b, 76a–b of the rollers 74,76 of the insert structure 70. The forward movement of the expanded web 30 pushes the insert structure 70 forward towards the outer guide members 77,79 so that the expanded web 30 is forced between the outer guide members 77,79 and the vertically spaced rollers 74,76. FIG. 4G is a view of the top portion of FIG. 4E. It shows the welded portion 28 riding along the flat crown portion 76b as the web 30 passes between the roller 76 and outer guide member 77.

Figure 4H:
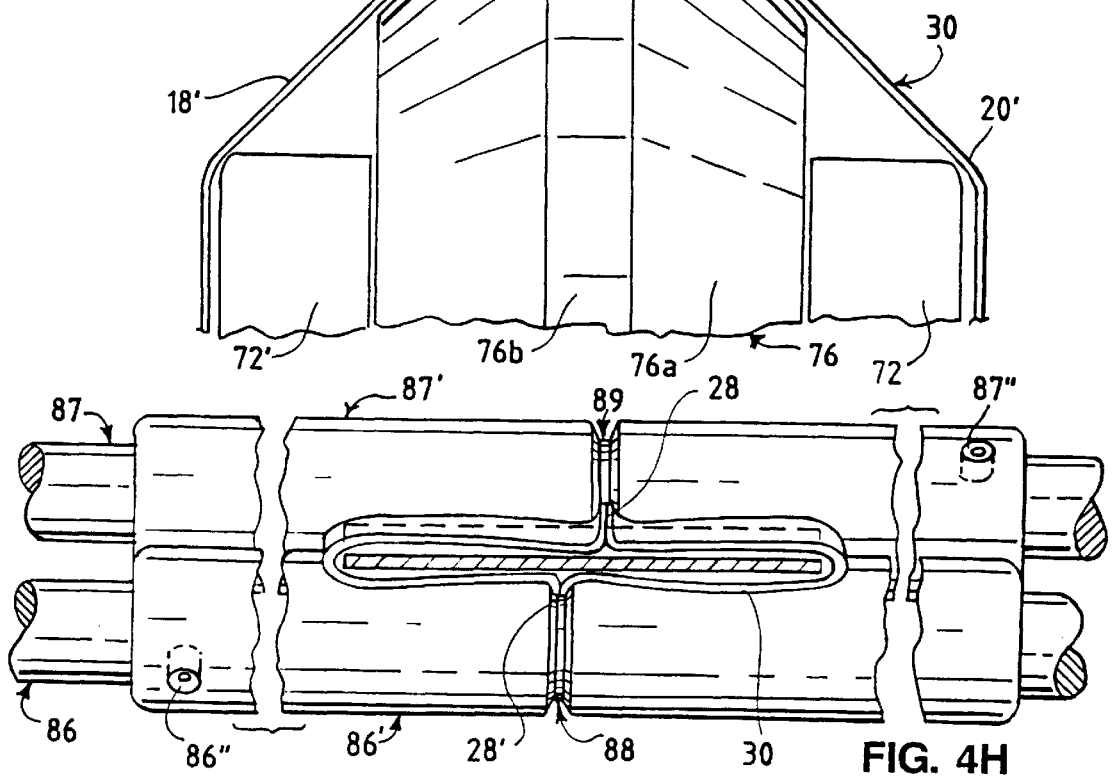

As seen in FIGS. 4' and 4H, after tubular web 30 passes around the insert structure 70, the web 30 passes between a stationary grooved sleeve 86' and a stationery grooved sleeve 87'. The insert structure guide plate 78 rests on the stationary shaft 86. The sleeves 86',87' are secured by one or more set screws 86",87" to stationary shafts 86,87. The shaft 87 is vertically adjustable and is located slightly downstream and above the shaft 86. As best seen in FIG. 4H, the sleeves 86',87' have laterally offset grooves 88,89 into which the bulging welded portions 28,28' of the web 30 enter respectively, to laterally offset the welded portions 28,28'. This lateral offset reduces the thickness of the completed cellular panel 10 when in a collapsed configuration because the welded portions 28,28' slightly bulge the tubular web 30. The grooved sleeves 86',87' are positioned by set screws 86" and 87" to obtain the desired offset positions. The stationary shafts 86,87 may carry additional grooved sleeves if manufacturing a plurality of webs at the same time, as seen in FIGS. 4M and 4N.

The web 30, after leaving the grooved sleeves 86',87', enters the weld flattening assembly comprising the flattening ultrasonic horn 33 and cylindrical rotating anvil 34 shown in FIG. 3E. The top and bottom welds 28,28' are located to the right and left of center lines of the top and bottom walls of the reformed web 30', as shown in FIG. 3E. The reformed tubular web 30' passes between the flattening ultrasonic horn 33 and cylindrical rotating anvil 34 shown in FIG. 3E which flattens the projecting weld 28,28' of the reformed tubular web 30' to produce a web of similar thickness throughout.

Figure 4I:
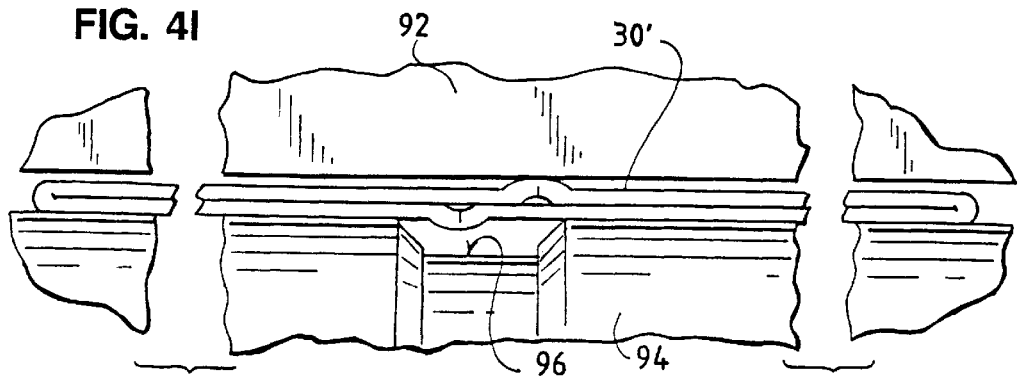
FIG. 4I is a transverse vertical sectional view along section line 4I—4I in FIG. 4' through an ultrasonic horn assembly which sets a sharp fold in the side edges of the preformed web.

As shown in FIGS. 4' and 4I, the reformed web 30' passes between another ultrasonic horn 92 and a cylindrical rotating anvil 94 similar to the weld flattening assembly previously described. This second ultrasonic horn 92 vibrates the reformed web 30' against the second cylindrical rotating anvil 94 to set the folds made at the outer longitudinal edges of the reformed web 30'. As best seen in FIG. 4I, the second cylindrical rotating anvil 94 has a recessed portion 96 substantially at its center where the welded portions 28,28' pass through. Without the recessed portion 96, the bulging welded portions of the web 30' would become heated to a much higher temperature than the rest of the web, which could cause a possible undesired welding together of the overlying layers of the web. This prevents the second ultrasonic horn from working directly onto the welded portions 28–28' and concentrates the work performed on the longitudinal edges of the reformed web 30'.

After this foldsetting, the reformed web 30' passes between drive roller 110 and nip roller 112 (FIG. 4'). The nip roller 112 is a bias controlled roller. The nip roller 112 is, thus, adjustable allowing the nip roller 112 to apply more pressure to one side of the reformed web 30' than the web's other side. Such a roller improves the control over the path of the web. The thicknesses of the substrate sheets 18,20 forming the web 30' can be different. Due to this possible variation in thickness, the web may try to move laterally as it passes between the drive and the nip rollers 110,112. The bias control nip roller 112 prevents any lateral movement of the web 30' and assures the web 30' travels in a straight path.

Figure 4J:
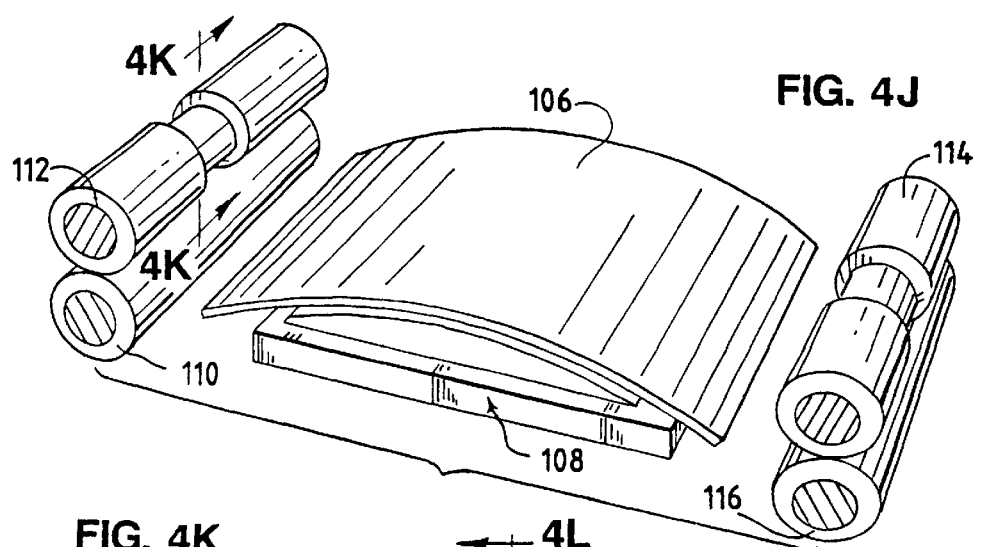
FIG. 4J is a perspective view showing in more detail a portion of the stress-relieving station of the production line of FIG. 4', which includes a heated cambered plate over which the re-formed web is fed.
Figure 4K:
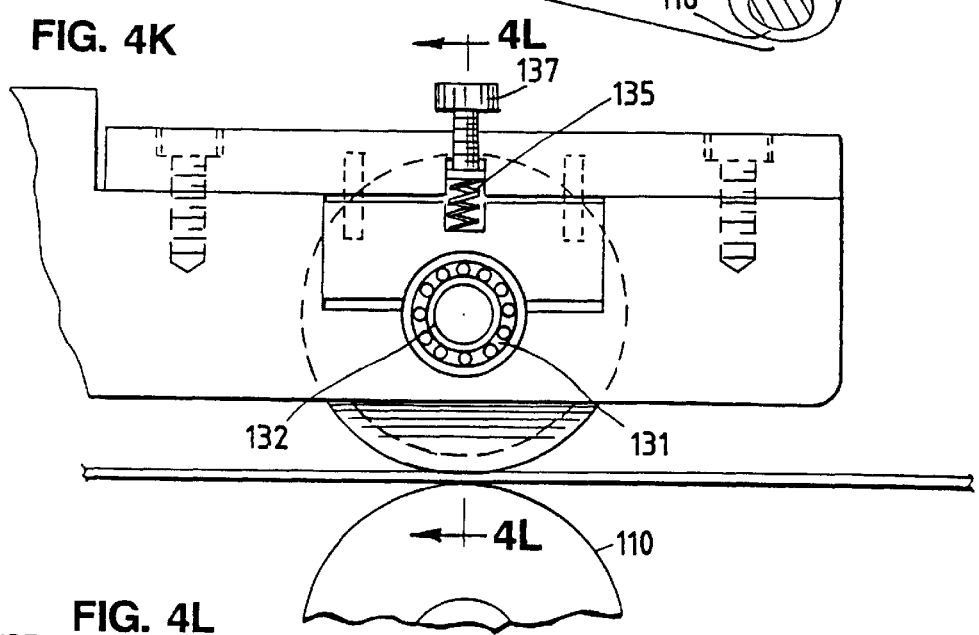
FIG. 4K is a longitudinal vertical sectional view along section line 4K—4K in FIG. 4J through a pair of drive and nip rollers at one end of the cambered plate.
Figure 4L:
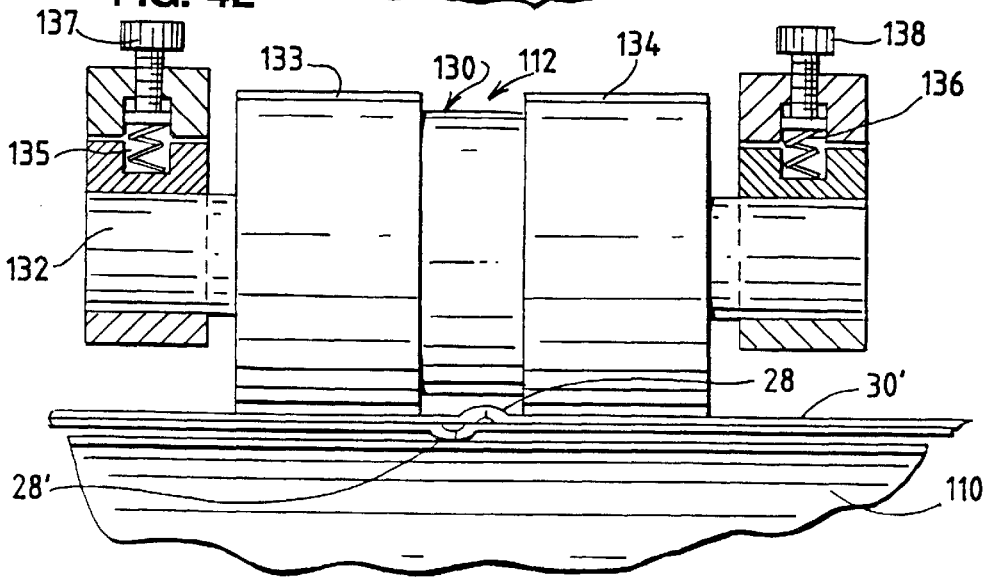
FIG. 4L is a transverse vertical sectional view along section line 4L—4L in FIG. 4K through the nip roller assembly.

FIGS. 4K and 4L illustrate the bias control nip roller 112 in more detail. FIG. 4K is a side view of the nip roller 112 taken along the line 4K—4K in FIG. 4J. FIG. 4L is a cross-sectional view taken along the line 4L—4L in FIG. 4K. The nip roller 112 has a grooved sleeve 130 which rides about a plurality of bearings 131 adjacent a common shaft 132. The grooved sleeve has outer sections 133,134 which contact the reformed web 30'. The grooved sleeve 130 allows the welded portions 28,28' to pass without contacting the nip roller 112. Spring assemblies 135,136, located on each end of the shaft 132, apply pressure independently to each outer section 133,134 of the nip roller 112. Set screws 137,138 allow the pressure to be adjusted on each outer section 133,134 of the nip roller 112. As described before, more pressure can then be applied to one side of the reformed web 30' than the other to prevent any lateral movement of the web 30' due to the different thicknesses of the substrate sheets 18,20.

The web 30' is next pulled under tension over a heated upwardly honed or cambered plate 106, as shown in FIG. 4' and FIG. 4J, to relieve the stresses produced in the flattened welded portions 28,28' of the reformed tubular web 30'. The cambered plate 106 is heated by a heating element 108 positioned below the plate. The tubular web 30' is forced downward against the heated cambered plate 106 by the passage or the web 30' between drive and nip rollers 110,112, the nip roller 112 being positioned below the lower inlet end of plate 106 and then between drive and nip rollers 116,114 at the outlet end of the plate 106 as seen in FIG. 4' and FIG. 4J.

Nip roller 114 is also a bias control roller, identical to nip roller 112, to assure the web passes over the upwardly honed cambered plate 116 in a straight path.

Heating the reformed tubular web 30' under tension relieves stresses produced in the welded portions 28,28' of the tubular web by the welding process. These stresses are apparent by a longitudinal bow in the reformed tubular web 30' and ripples at the welds 28,28' prior to passing over the heated cambered plate 106. The relief of these stresses in the welds 28,28' minimizes any ripples and produces a flat, unbowed tubular web 30'.

As seen in FIG. 4', the reformed tubular web 30' passes under a further idler roller 118, over an adjacent idler roller 120 and passes under a dancer tensioning roller 122 which controls tension in the web 30'. The web 30' proceeds over the two idler rollers 124,126 to an individual powered take-up reel 128 for later fabrication, as shown in FIG. 4, or is immediately processed to form the cellular panel 10.

Although FIGS. 4A–4L show the manufacture of only one tubular web 30 at a time, the comb-like structure 66 (FIG. 4N) has a plurality of vertical rods 68 to receive a number of tubular webs 30a–30d simultaneously. Such a modified production line is shown in FIG. 4M. As seen in FIG. 4M, a number of tubular webs 30a–30d can be manufactured from a wider, continuous tubular web of a pair of supplemental continuous substrate sheets 18a,20a. The continuous substrate sheets 18a,20a, made of similar material as substrate sheets 18,20, are unwound from powered supply reels (not shown) and pass through a similar set of rollers (like rollers 44 through 60), as shown in FIG. 4. These rollers are wider, however, to accommodate the wider substrate sheets 18a,20a. The superimposed wider substrate sheets 18a,20a then are passed between a common ultrasonic horn 26' vibrating the wider superimposed substrate sheets 18a,20a against a plurality of laterally spaced rotating slit/weld anvils 24' positioned adjacent to one another. This produces a plurality of closed welded tubular webs 30a–30d which pass through a plurality of slit sensor pins 59 (as described before). The webs 30a–30d pass between the vertical rods 68 in the comb-like structures 66,66' (FIG. 4N). Each tubular web 30a–30d is then further processed in the manner just described and wound onto separate reels.

Exemplary specifications for some of the production lines described include a sonic horn like that shown in FIG. 4O. The sonic horn is connected to a booster B1 driven by a converter C1 which is fed from a commercial AC power line.

The following are a set of exemplary specifications for the production line shown in FIGS. 4 and 4':
1. Web feed speed: 17.5 feet per minute
2. Specification of substrate sheet 18: 0.007" thick woven polyester fabric.
3. Specification of substrate sheet 20: 0.007" thick nonwoven polyester fabric.
4. Specification of sonic welder ultrasonic horn 26:
   a. power supply; converts 50/60 Hz line current to 20 KHz electrical energy;
   b. converter; converts electrical oscillations into mechanical vibrations.
   c. booster (1:2 ratio); modifies the amplitude of vibrations.
   d. amplitude (65% setting at power supply control); function of horn shape, peak to peak displacement of the horn at its work face.
   e. horn; ½"×9" carbide tipped face titanium.
   f. manufactured by Branson Ultrasonics corporation, 41 Eagle Road, Danbury, Conn. 06813 identified by Model Number 900B.
5. Specification of slit/weld anvil 24: stationary, 1" diameter, ⅛" wide, 150 degrees, 0.005 r.
6. Slit/weld anvil 24 pressure against web: 40 PSI.
7. Specification of weld-flattening ultrasonic horn 33:
   a. power supply; converts 50/60 Hz line current to 20 KHz electrical energy;
   b. converter: converts electrical oscillations into mechanical vibrations.
   c. booster (1:1.5 ratio); modifies the amplitude of vibrations.
   d. amplitude (80% setting, pneumatic engagement and retraction.
   e. horn; ½"×9" carbide tipped face titanium.
   f. manufactured by Branson Ultrasonics Corporation, 41 Eagle Road, Danbury, Conn. 06813 identified by Model Number 900AO.
8. Specification of weld-flattening cylindrical anvil 34: 4" diameter, driven at 17.85 feet per minute (2% overdrive for web tensioning).
9. Specification of grooved guide rollers 77,79: ⅞" diameter, ¹⁄₁₆" spacing (o-ring), 1⅛" vertical distance between upper and lower pairs.
10. Specification of guide plate 78: 0.030" thick, ⁹⁄₁₆" to 1⁵⁄₁₆" taper over 9½" distance.
11. Specification of foldsetting ultrasonic horn 92:
    a. power supply; converts 50/60 Hz line current to 20 KHz electrical energy;
    b. converter; converts electrical oscillations into mechanical vibrations.
    c. booster (1:1.5 ratio); modifies the amplitude of vibrations.
    d. amplitude (80% setting, pneumatic engagement and retraction.
    e. horn; ½"×9" carbide tipped face titanium.
    f. manufactured by Branson Ultrasonics Corporation, 41 Eagle Road, Danbury, Conn. 06813, identified by Model Number 900AO.
12. Specification of foldsetting cylindrical anvil 94: 4" diameter, driven at 17.85 feet per minute (2% overdrive for web tensioning) with weld seam clearance relief.
13. Pneumatic pressure exerted by weld-flattening ultrasonic horn 33 against weld-flattening cylindrical anvil 34: 12–14 PSI.
14. Pneumatic pressure exerted by foldsetting ultrasonic horn 92 against foldsetting cylindrical anvil 94: 22–24 PSI.
15. Specification of nip rollers 112,114: 1⅛" wide, 2" diameter, ¼" wide groove.
16. Specification of heated cambered plate 106: 230 degrees F., ½" rise at center 24" length.
17. Specification of drive roller peripheral speed: 17.94 feet per minute (0.5% tensioning overdrive).

Figure 5:
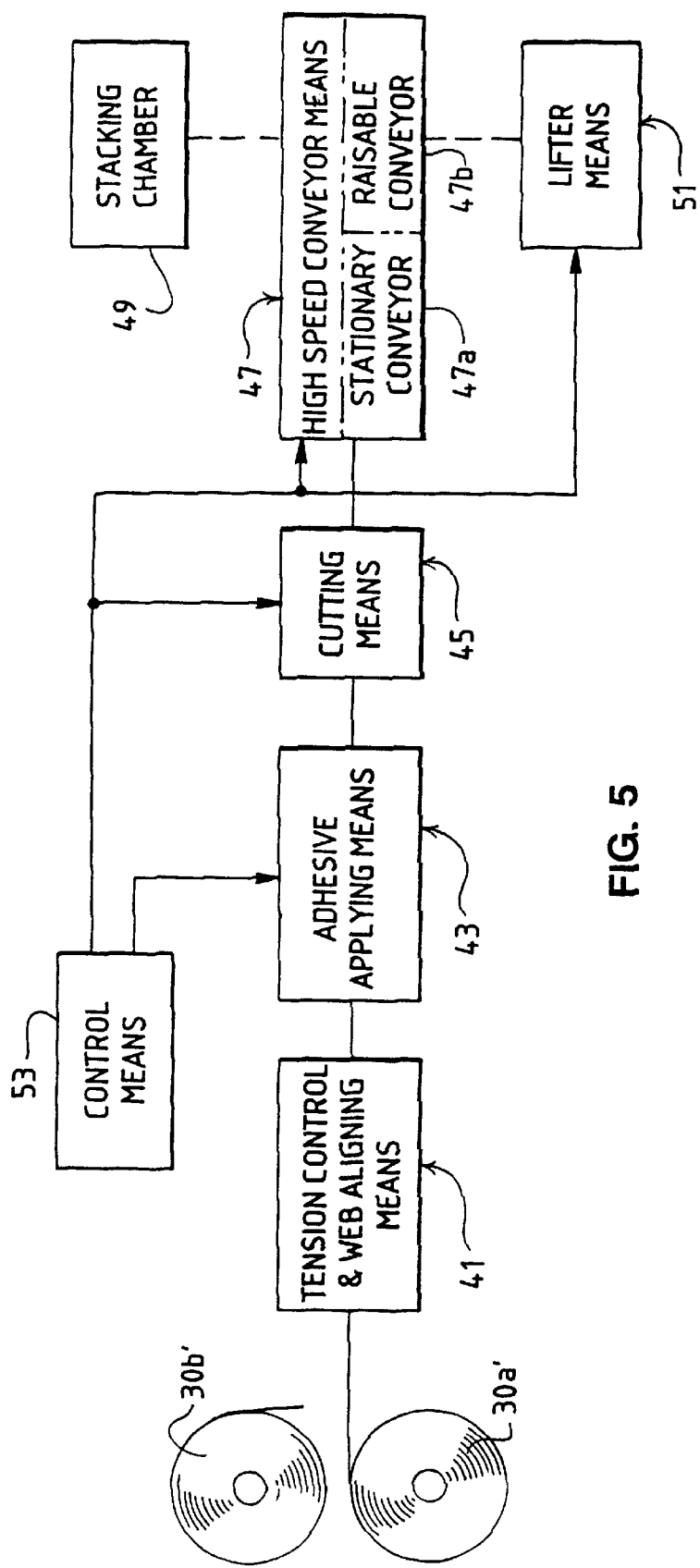
FIG. 5 is a block diagram showing how a multi-substrate web formed by the production line of FIGS. 4 and 4' is further processed by applying adhesive to the web, cutting the web into strips, and then stacking the strips to form a completed continuous cellular panel.

FIG. 5 is a block diagram illustrating the steps of forming a cellular panel 10, from a continuous flat reformed tubular web like web 30',30*a*,30*b*,30*c* or 30*d*. The functions performed by the blocks shown therein may be performed, for example, by the tension control web aligning, adhesive applying, and web cutting and stacking chamber disclosed in U.S. Pat. No. 4,450,027 or copending Application Ser. No. 07/839,600 filed Feb. 28, 1992. A pair of reels of a pair of reformed webs 30*a* and 30*b* ' are shown in FIG. 5 supported one above the other. The web 30*a*' on one reel is unwound in a horizontal plane while it passes first through tension control and web aligning means 41 comprising rollers (not shown) to maintain tension and laterally align the tubular web 30*a*'. The tubular web 30*a*' then passes through an adhesive applying means 43 which applies the two bands 11,11' of adhesive, (FIG. 1). The two bands of adhesive 11,11' are applied to the portion of the web 30*a*' to form the top wall portion 15 of each cell 12 formed from the tubular web 30*a*,(FIG. 2). As shown in FIG. 1A, the bands of adhesive 11,11' are applied over the welded portions 28,28' of the tubular web 30*a*' to reinforce the welds. The bands of adhesive 11,11' are spaced to leave the center portion of the top wall portion 15 of the tubular web 30*a*' free of adhesive. This allows for drilling through the center of the top wall portion 15 of the tubular web 30' to accommodate the drawstrings of a complete cellular panel 10 without the drilling means coming into contact with the adhesive. If adhesive was applied along the entire top wall portion 15, the drilling means would have to be periodically cleaned or replaced after the adhesive built up on the drilling means.

Referring again to FIG. 5, the tubular web 30*a*' is then cut into identical tubular strips by a cutting means 45. The strips cut from the web 30*a*' form the cells or tubular sections 12 of the panel 10. The web 30*a*' is then fed by high speed conveyor means 47 to a stacking chamber 49, both similar to that disclosed in U.S. application Ser. No. 839,600. The stacking chamber 49 receives the flat tubular strips through a strip pass-through slot (not shown) located in the floor of the stacking chamber extending the length of the tubular strips. The conveyor means 47 includes a stationary conveyor belt section 47*a* which separates the cut strips and a raisable conveyor section 47*b* which is raised by a lifter means 51. The conveyor sections 47*a*,47*b* may each include suction conveyor belts which hold the strips by suction thereon. The lifter means 51 raises the raisable conveyor 47*b* through the slot in the floor of the stacking chamber 49. This pushes the strip, held on the belts by suction, off the belts and up against the strip above it. This strip is thus raised in the stacking chamber 49, so that the adhesive bands 11,11' adhere to the bottom of the strip above it, as shown in FIG. 1A. The movement of the belt forming the raisable conveyor 47*b* is stopped when a strip is in alignment along its length with the inlet slot of the stacking chamber 49.

To properly align the tubular strips in the stacking chamber 49, the bottom of the stacking chamber may be defined by a pair of vertical confronting walls (not shown) which are spaced apart a distance slightly greater than the width of the strips. These walls thus laterally align each strip being pushed into the stacking chamber with the strip above it. The upper portion of the stacking chamber preferably has opposite upwardly diverging walls so that the laminated strips raised momentarily in the chamber will not get stuck in the chamber. The proper timing of the operation of all of the stations of the production line shown in FIG. 5 is determined by suitable and conventional control means identified by a block 53 in FIG. 5.

After a strip is pushed into the stacking chamber and adhered to the strip above it, the lifter means 51 lowers the raisable conveyor 47*b* which passes down through the pass-through slot in the bottom of the stacking chamber 49. The strip just stacked separates from the raisable conveyor as it is pulled against the floor of the chamber 49 by the downward movement of the raisable conveyor 47*b*. The movement of the belt of the raisable conveyor 47*b* then resumes as it receives the next strip to be pushed into the stacking chamber 49. The sequence of operation just described is repeated to form the expandable cellular panel 10 in a mass production operation. When one of the web reels 30*a*' is completely unwound, a photo cell (not shown) senses this condition and stops the web feed. The leading edge of the other reel, for web material 30*b*', is then spliced to the trailing edge of the completely unwound web 30*a*'.

Embodiment of FIGS. 6–10

FIGS. 6–10 illustrate another embodiment of the present invention where a non-light controlling cellular panel 10' is made similar to the panel 10 shown in FIG. 1, except that it is formed from a plurality of horizontally elongated open top tubular sections 12' or cells rather than closed tubular sections. FIG. 6 shows a portion of such a cellular panel 10'. As seen in FIG. 7, each tubular section 12' is formed of front and rear substrate sheets 18',20' of two differently appearing substrate materials. Each tubular section 12' has a top wall portion 15', formed by spaced inturned longitudinal margins of the substrate sheets 18' and 20', a bottom wall portion 17' formed by the opposite longitudinal margins of the substrate sheets welded together at 28*a*, and front and rear wall portions 14' and 16' respectively formed by the sheets 18' and 20'. Each tubular section 12' is formed from strips cut from a folded continuous two-substrate web formed by folding the initially flat web 31, (FIG. 8F). The outer longitudinal marginal portions of the unfolded continuous multi-substrate web 31 are folded over the central portion of the web to form an open tubular flat web which is coated with adhesive, cut into strips, and the adhesive-coated strips are sequentially stacked. The flat web 31 is made in the manner shown in FIGS. 8A–F.

FIG. 8A shows two differently appearing substrate sheets 18', 20' with their opposite longitudinal edges 22,22' aligned. FIG. 8B shows the substrate sheets 18',20' superimposed with only one of their aligned longitudinal edges 22,22' being welded together at 28*a*. The substrate sheets 18',20' pass between a preferably driven rotating slit/weld anvil 24 and an ultrasonic horn 26. This assembly is similar to that used in the welding process described with respect to the closed tubular web 30 in FIGS. 1–5. The ultrasonic horn 26 vibrates against the rotating slit/weld anvil 24, welding the substrate sheets 18',20' together to form a continuous folded tubular web 31 open at one end. This process produces a selvedge portion 32' which is collected. The web is then unfolded to form the flat web 31 shown in FIG. 8D and the weld 28*a* is flattened by a flattening ultrasonic horn 33 pressing the downwardly projecting weld against a cylindrical driven rotating anvil 34, as shown in FIG. 8E. The cylindrical rotating anvil 34 is driven. The weld flattening process just described leaves just a slight bulge 36 in the open multi-substrate web 31.

Figure 9:
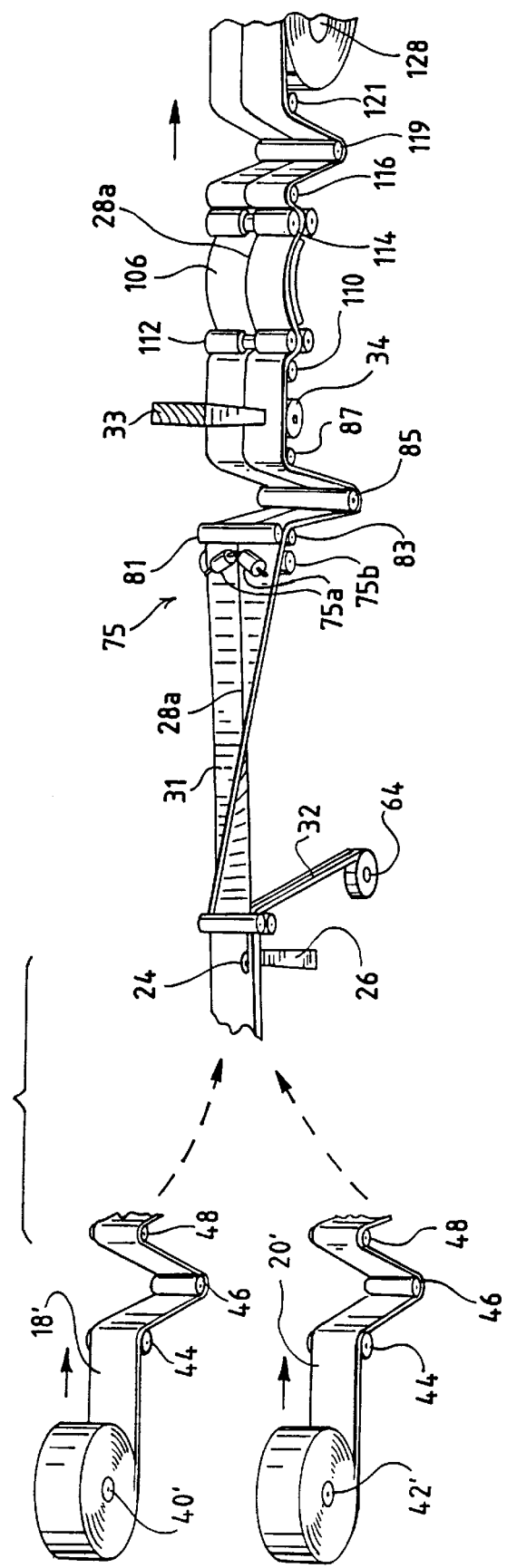
FIG. 9 shows part of a production line for performing the various steps which form the multi-substrate sheet web of FIGS. 8A–8F.

FIG. 9 illustrates a portion of the production line utilized in manufacturing the open tubular web 31. The production line has two powered supply reels 40',42' of the substrate sheets 18',20' made of different material. The substrate sheets 18',20' pass through an identical roller set up (not completely shown) as previously discussed for the closed tubular web 30 which tensions the substrate sheets 18',20' and superimposes the opposite longitudinal edges 22,22' of the substrate sheets 18',20'.

The substrate sheets 18',20' are then welded together at one of their aligned longitudinal edges 22,22' by the vibrating ultrasonic horn 26 and slit/weld anvil 24 assembly, as previously described with respect to FIG. 8B. The selvedge portion 32' produced by the welding process is also wound upon a driven take-up reel 64. After the substrate sheets 18',20' are welded together, a continuous open tubular web 31 is formed having different appearing substrate materials. The open tubular web then passes between drive roller 35 and nip roller 37 which pull the substrate sheets 18',20' through the welding assembly 24,26. Although not shown in FIG. 9, it is understood that the open tubular web 31 can also pass through slit sensor pins as described.

The open tubular web 31 is then unfolded prior to entering the weld flattening assembly to form an unfolded flat multi-substrate web. To aid in unfolding the open tubular web 31, the open tubular web 31 passes under a skewed roller assembly 75 made up of skewed top driven rollers 75a,75a which exert outward forces on the web 31 and a driven bottom roller 75b. The unfolded multi-substrate web 31 then passes between two idler rollers 81,33, and under a dancer tensioning roller 85, which controls tension in the web 31 by adjusting the speed of the driven supply and take-up reels 40',47',128. The web proceeds over a further idler roller 87 before entering the weld flattening apparatus. The welded portion 28a of the open multi-substrate web 31 is then flattened by the flattening ultrasonic horn 33 and cylindrical rotating anvil 34, as previously described with respect to FIGS. 8C–8E.

After the flattening process, the flat open multi-substrate web 31 passes between drive and nip rollers 110,112 and over a heated cambered plate 106 to relieve the stresses produced in the welded portion 28a of the is open multi-substrate web 31 from the welding process as seen in FIG. 9. The heated cambered plate 106 is identical to that described in the embodiment for the closed tubular web 30 with respect to FIGS. 1–5. The heat subjected to the open multi-substrate web 31 relieves the stresses in the welded portion 28a, thus minimizing ripples and producing a flat, as well as straight open multi-substrate web 31, which then can be processed further with less difficulties.

The open multi-substrate web 31 continues between drive and nip rollers 114,116, and under a dancer tensioning roller 119, which controls tension in the web 31. The web 31 proceeds over an idler roller 121 to an individual powered take-up reel 128 for later fabrication as shown in FIG. 9, or is immediately processed to form the cellular panel 10'.

Figure 10:
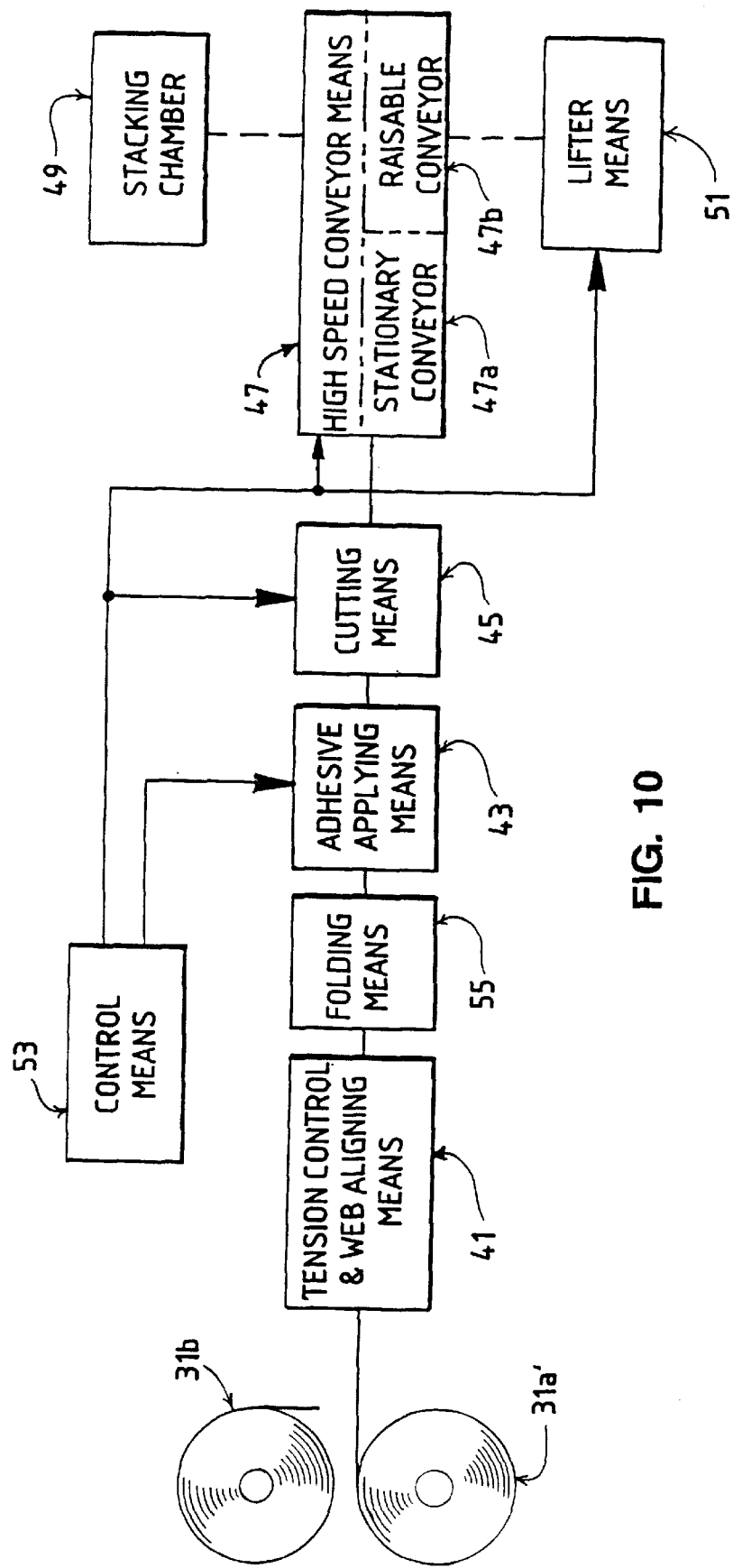
FIG. 10 is a block diagram showing how the multi-substrate web formed by the production line of FIG. 9 is further processed by folding the multi-substrate web, applying adhesive to the web, cutting the web into strips and then stacking the strips to form a completed continuous cellular panel of FIG. 6.

FIG. 10 is a block diagram illustrating the steps in forming the open cellular panel 10' of FIG. 6 formed from the flat web 31. It is very similar to the process for making the cellular panel 10 formed by the closed tubular web 30 as previously discussed with respect to FIGS. 1–5. Accordingly, similar stations in FIG. 10 have been identically numbered to those in FIG. 6. One difference is the addition of folding means 55 before the adhesive applying means 43. A suitable folding means is disclosed in U.S. Pat. No. 4,450,027 or in U.S. application Ser. No. 08/040,869, filed on Mar. 31, 1993, entitled "Folding Plate Assembly For Fabricating Honeycomb Insulating Material" and filed in the names of Bryan K. Ruggles and Cary L. Ruggles. As disclosed in that application, the folding means includes a slot folding plate assembly through which the web 31 passes. The slot is shaped to cause the outer longitudinal edges of the flat multi-substrate web 31 to raise above and over the central portion of the web 31, thus folding the web. The confronting longitudinal margins of the folded web which form the top wall portion 15' of the folded web do not contact one another, leaving a gap 57 in the top wall portion 15' (FIG. 6A). The folding means 55 may also include a fold setting means in the form of a heated drum (not shown) which heats the web material to its heat set temperature. The heated folded web is pressed against the drum to form sharp permanently set folds. A cooling means (not shown) then cools the pressed web below the setting temperature forming set pressed folds 13,13' shown in FIGS. 6 and 7.

The tubular web 31 next passes through adhesive applying means 43 which applies two bands of adhesive 11–11' on the top wall portion 15' of the open tubular web 31 (FIG. 7). The open tubular web 31 is then cut into identical tubular strips by cutting means 45 which, by conveyer means, are fed to a stacking chamber 49 which may be similar to that disclosed in U.S. application Ser. No. 07/839,600, as previously discussed in detail with respect to the closed tube cellular panel 10 of FIGS. 1–5.

Embodiment of FIGS. 11–14

FIGS. 11–14 illustrate a light controlling cellular panel 10" of the present invention. It comprises horizontally elongated vertically aligned cells or tubular sections 12" formed from an open flat tubular web 30". The web 30' is folded, coated with adhesive, and cut into strips; the strips are then stacked in the manner previously described. An opaque substrate sheet 19" in each tubular section 12" controls light passing through the panel 10". When the opaque substrate sheet 19" is rotated to a vertical plane, light passing through the panel is obstructed.

FIG. 11 shows a portion of the light-controlling cellular panel 10". The cellular panel 10" is formed by laminating separate open tubular strips when in a flattened condition, as shown in FIGS. 14C and 14D, to form a tubular section 12". Each cell 12" has a front wall portion 14" made of a sheer substrate sheet 18" of one mesh size, a rear wall portion 16" made of a sheer substrate sheet 20" of a different mesh size, a bottom wall portion 17" made of a wider substrate sheet 19" of opaque material, and a top wall portion 15" which is formed by the bottom wall portion 17" of an adjacent cell 12" and the inwardly turned upper ends of the substrate sheets 18",20" secured to the opaque sheet 19" by spaced bands of adhesive 11".

The open tubular strips are first formed from a flat continuous web 30" made of three separate substrate sheets 18",19",20" (FIG. 12A) which are welded together along their longitudinal margins. FIG. 12A shows the three superimposed substrate sheets 18",19",20" with the left longitudinal edges 22' and 22" of the wider central opaque substrate sheet 19" and lower sheer substrate sheet 20" aligned, and the right longitudinal edges 22" and 22 of the central opaque substrate sheets 19" and upper sheer substrate sheet 18" aligned. As seen in FIG. 12B, the three-substrate sheets 18",19",20" are welded together at their aligned two-substrate thick longitudinal edges by passing the substrate sheets 18",19",20" between a common vibrating ultrasonic horn 26 and slit/weld anvils 24 identical to the welding apparatus as previously described. Thus, outer sheer substrate sheet 18" is welded to the wider opaque substrate sheet 19" at the right aligned longitudinal edges thereof while the other outer sheer substrate sheet 20" is simultaneously welded to the opaque substrate sheet 19" at the aligned left longitudinal edges thereof to form a Z-shaped web 30" which is unfolded, as shown in FIG. 12C. When unfolded, the web 30" has a center opaque substrate sheet 19" and outer sheer substrate sheets 18",20" all in the same plane.

After the welding process, the welded portions 28" of the unfolded web 30" are flattened to form a flat web of similar thickness throughout. As seen in FIG. 12D, the welded portions 28" are flattened by passing the flat multi-substrate web 30" between the flattening ultrasonic horn 33 and cylindrical rotating anvil 34. The pressure applied by the flattening ultrasonic horn 33 to the welded portions 28" of the multi-substrate web 30" against the cylindrical rotating anvil 34 flattens the welded portions 28" to produce a multi-substrate web 30" with similar thickness throughout.

Figure 13:
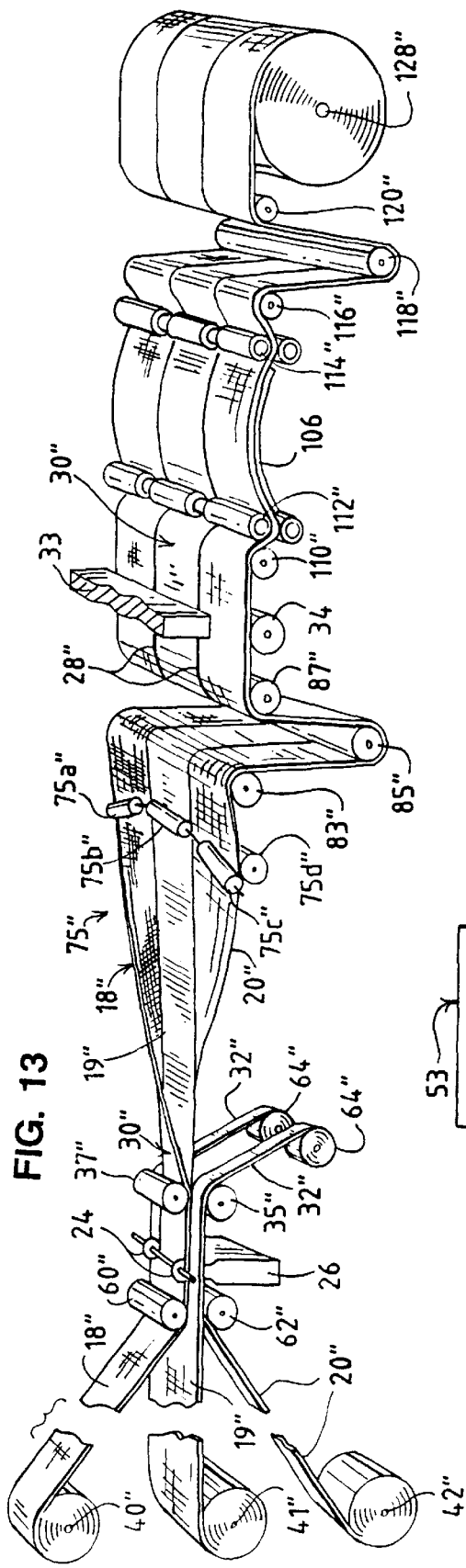
FIG. 13 shows part of a production line for performing the various steps which form the multi-substrate sheet web of FIGS. 12A–12D.

FIG. 13 shows a portion of the production line for manufacturing the continuous flat multi-substrate web 30". The production line begins with driven reels 40",41" and 42" of continuous substrate sheets 18", 19" and 20" unwinding the sheet material therefrom. The substrate sheets 18",19", 20" pass through similar sets of web-tensioning rollers (not shown) as discussed previously. The three-substrate sheets 18",19",20" are then superimposed with their longitudinal edges aligned as described, by passing them in superimposed relation between a pair of idler rollers 60",62" with one outer sheer substrate sheet 18" on top, the center opaque substrate sheet 19" in the middle, and the outer sheer substrate 20" on the bottom of the superimposed stack of sheets.

Each outer sheer substrate sheet 18",20" is then simultaneously welded to the longitudinal edge of the center opaque substrate sheet 19" in alignment therewith by vibrating ultrasonic horn 26 and against the slit/weld anvils 24, as previously described with respect to FIG. 12B. The selvedge portions 32" produced by the welding process are also rewound by take-up reels 64". After the substrate sheets 18",19",20" are welded together, a Z-shaped web 30" is formed. The Z-shaped web passes between a drive roller 35" and a nip roller 37" which act to pull the substrate sheets 18",19",20" through the welding assembly. Although not shown in FIG. 13, it is understood that the web 30" can also pass through slit sensor pins as previously described with respect to the closed-tube cellular panel 10.

As previously described, the Z-shaped web 30" is then unfolded before entering the weld flattening apparatus to form a flat substrate sheet. To aid in the unfolding, the Z-shaped web 30" passes beneath a skewed roller assembly 75" comprised of driven upper rollers 75a",75b",75c" and bottom roller 76d. The driven rollers 75a" and 75c" overlying the outer sheet substrate sheets 18", 20", exert downward and outward forces on the outer sheer substrate sheets 18" and 20". A transversely extending roller 75b" overlying the central opaque sheet 19" exerts a downward force on the center opaque substrate sheet 19" passing beneath the same. The flat multi-substrate web 30" then passes over an idler roller 83", under a dancer tensioning roller 85" and over a second idler roller 87". The projecting welded portions 28" of the multi-substrate web 30" are then flattened by the flattening ultrasonic horn 33 and cylindrical rotating anvil 34, as previously described with respect to FIG. 12D.

After the flattening process, the flattened multi-substrate web 30" passes between drive and nip rollers 110",112" and then over a heated cambered plate 106 to relieve the stresses produced in the welded portions 28" of the multi-substrate web 30" from the welding process. The heated cambered plate 106 is identical to that described in the embodiments of FIGS. 1–5.

The multi-substrate web 30" then continues between further drive and nip rollers 114",116", under a dancer tensioning roller 118" and over an idler roller 120" to either an individual driven take-up reel 128" for later fabrication as shown in FIG. 13, or immediately processed to form the cellular panel 10".

Figure 14:
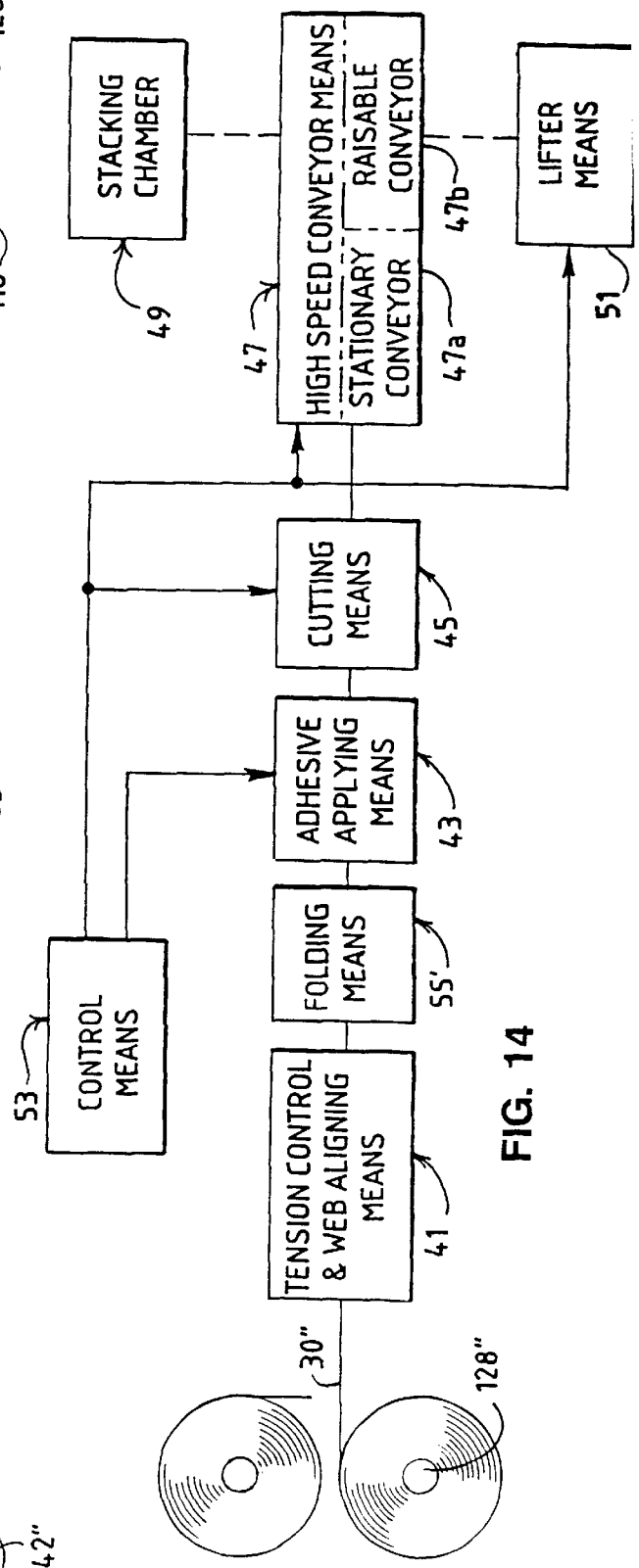
FIG. 14 is a block diagram showing how the multi-substrate web formed by the production line of FIG. 13 is further processed by folding the multi-substrate sheet web, applying adhesive to the web, cutting the web into strips and then stacking the strips to form the completed continuous cellular panel of FIG. 11.
Figure 14A:
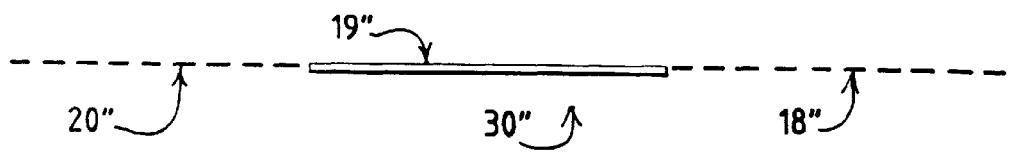
FIGS. 14A–14D illustrate the tubular web produced by the production line of FIG. 13 respectively, before the web is folded, after it is folded, after adhesive is applied to it, and after strips cut from it are laminated together.
Figure 14B:
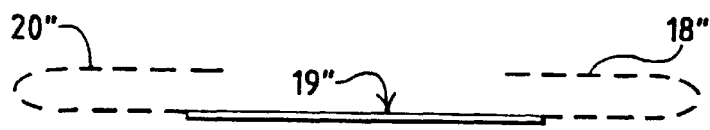
Figure 14C:
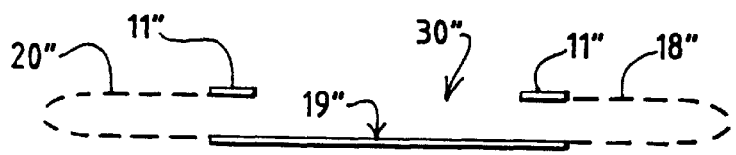
Figure 14D:
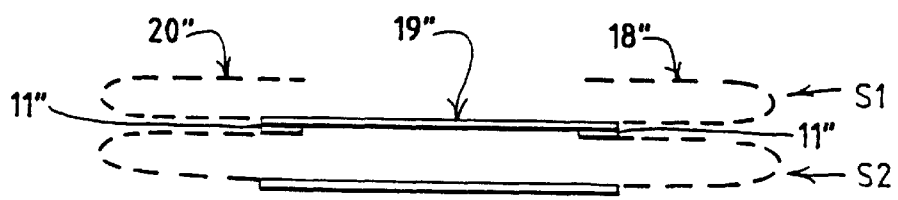

FIG. 14 shows a block diagram illustrating the steps of forming the light controlling cellular panel 10" formed from the flat unfolded multi-substrate web 30". It is very similar to the process utilized to make cellular panel 10' formed from an open tubular web in accordance with FIG. 10. Accordingly, corresponding reference numerals are used in FIG. 14 to avoid a repetition of description. However, the folding means 55' is different from the folding means 55 in FIG. 10 which forms sharp set folds 13'—13' in the web 31'. The folding means 55' includes no heated drum or other means to set any folds so that, as shown in FIG. 11, there are no folds seen at the sides of the rectangular tubular sections. The folding means, therefore, preferably includes only a slot forming plate, as shown in copending application Ser. No. 839,600.

FIGS. 14A—14D illustrate respectively transverse sections of the web 30" as it unwinds from the reel 128", and when it leaves the folding means 55' and adhesive applying means 43. Note that in FIG. 14C the bands of adhesive 11"—11" deposited by the adhesive applying means 43 on the folded-over marginal portions of the outer substrate sheets 18" and 20" overlie the outer marginal portions of the opaque substrate sheet 19". FIG. 14D shows adjacent strips S1 and S2 cut from the web 30" pushed in the stacking chamber 49 where these strips are laminated together by the adhesive bands 11"—11". Thus, when a panel 10", shown in FIG. 11, is allowed to expand, the cells or tubular sections have the rectangular shape shown therein.

When the outer sheer substrate sheets 18",20", which form the front or rear wall portions 14" or 16" of the cellular panel 10", are shifted up or down with respect to each other, the wide opaque substrate sheets 19" of the various laminated strips shift from a horizontal position where light passes through the cellular panel 10". The opaque substrate sheets 19" are then inclined upwardly to an upstanding position where the opaque substrate sheets 19" of adjacent strips overlap, because they are wider than the outer substrate sheets 18", 20". In this position, the passage of light through the panel 10" is prevented.

Embodiment of FIGS. 15–19

Figure 16:
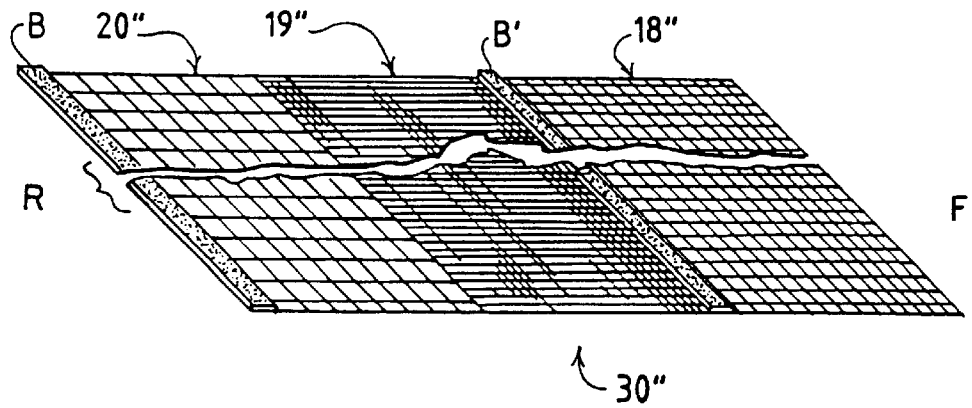
FIG. 16 is the multi-substrate web produced by the production line in FIG. 13 coated with bands of adhesive.
Figure 17:
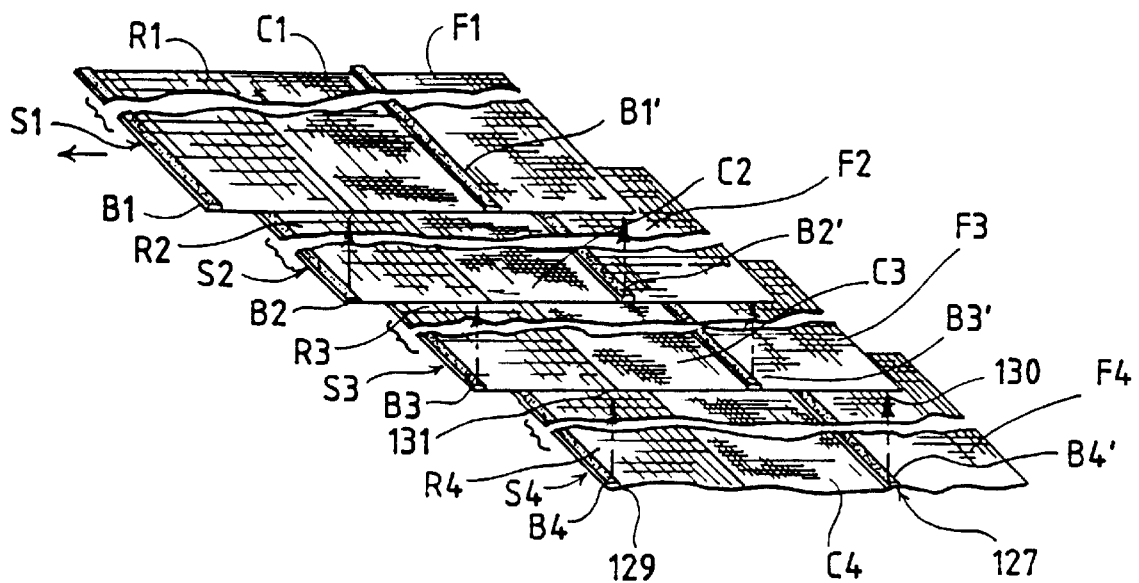
FIG. 17 shows a plurality of strips cut from the web of FIG. 16 and laterally shifted with respect to each other, with arrows indicating the points where the adhesive band coated on the strip will adhere the laterally shifted strips together, to form the light-controlling cellular panel of FIG. 15.

Another method of making a light controlling cellular panel comprising of horizontally elongated vertically aligned cells utilizes an unfolded substrate web 30" identical to that formed by the production line shown in FIG. 13. However, the web 30" is processed differently, as illustrated in FIGS. 16–19, to produce a panel 10''' shown in FIG. 15 which shows a portion of the panel 10'''. FIG. 16 shows the multi-substrate web 30" with bands of adhesive B and B' applied along the outer longitudinal margin, of the rear sheer substrate sheet 20", and along the front margin of the opaque sheet 19" opposite the inner or front margin of the sheer substrate sheet 20". The web 30" is then cut into strips sequentially to form three-substrate strips S1,S2,S3, etc. as shown in FIG. 17.

The closed tube cellular panel 10''' is formed by laminating in sequence the flat unfolded multi-substrate strips S1,S2, etc. together in identically oriented positions at transversely spaced points therealong to the previously cut strip located above it.

As shown in FIGS. 16 and 17, the bands of adhesive B', B of each strip thus adhere (a) the front margin 127 of the center opaque substrate sheet 19" of each strip to the outer margin 130 of the front sheer substrate sheet 18" of the strip above it, and (b) the outer margin 129 of the rear sheer substrate sheet 20" of the former strip to the rear margin 131 of the center opaque substrate sheet 19" above it. FIGS. 15A and 15B are fragmentary views of the portion of the cellular panel 10''' of FIG. 15, showing the adhesive connections of the identical multi-substrate strips when the panel is expanded. When the outer margin 129 of the rear sheer substrate sheet 20" of the uppermost strip S1 and the rear margin 127 of the center opaque substrate sheet 19″ of the uppermost strip S1 are fixed in the position they are to assume in the expanded cellular panel 10″, and the rest of the panel 10″ is allowed to drop under the force of gravity, a light controlling panel 10‴ is formed comprising horizontally elongated vertically aligned closed tubular cells 12‴ as seen in FIG. 15. The front vertical wall 14‴ or side of each cell 12‴ is formed by the front sheer substrate sheet 18″ of one of the multi-substrate strips; the rear vertical wall 16‴ or side of the cell 12‴ is formed by the rear sheer substrate sheet 20′ of the multi-substrate strip above it. The bottom horizontal wall 17‴ of each cell 12‴ is formed by the center opaque substrate sheet 19″ of said one strip; and the top horizontal wall 15‴ of that cell is formed by the center opaque substrate sheet 19‴ of the strip above it. Stated another way, the front and rear substrate sheets 18″,20″ of each strip form respectively the front and rear wall portions of adjacent cells.

In order to better understand the relationship between the various cut and laterally offset laminated multi-substrate strips S1,S2,S3,S4 shown in FIG. 17 that form the expanded panel 10‴ in FIG. 15, the front substrate sheet of each strip is designated by the letter F, the center opaque substrate sheet of each strip is designated by the letter C and the rear substrate sheet of each strip is designated by the letter R, with the particular substrate sheet of a given strip being further identified by a reference number corresponding to the reference number identifying that strip. Similarly, the forwardmost adhesive band of each strip is identified by the letter B′ and the rearmost adhesive band of each strip identified by the letter B, with the various adhesive bands of the various strips each identified by a number corresponding to the number of the particular strip involved. Thus, the various substrate sheets, adhesive bands of the various strips shown in FIG. 17 can immediately be identified in FIG. 15.

The adjustment of the panel 10‴ to obtain the light passing and obstructing modes of operation is very similar to that of the open tube panel 10″ of FIGS. 11–14. When the front and rear sheer substrate sheets 18″,20″ of the multi-substrate strips S1,S2, etc. making up panel 10‴ are shifted vertically relative to one another from their positions shown in FIG. 15, the center opaque substrate sheets 19″ of the various strips of the cellular panel 10‴ are pivoted from horizontal light-passing positions to upstanding light-blocking positions. Because the center opaque substrate sheets 19″ are wider than the outer sheer substrate sheets 18″,20″, the center opaque substrate sheets 19″ overlap one another in their light-blocking upstanding positions, thus preventing any light from passing through the cellular panel 10‴.

Figure 18:
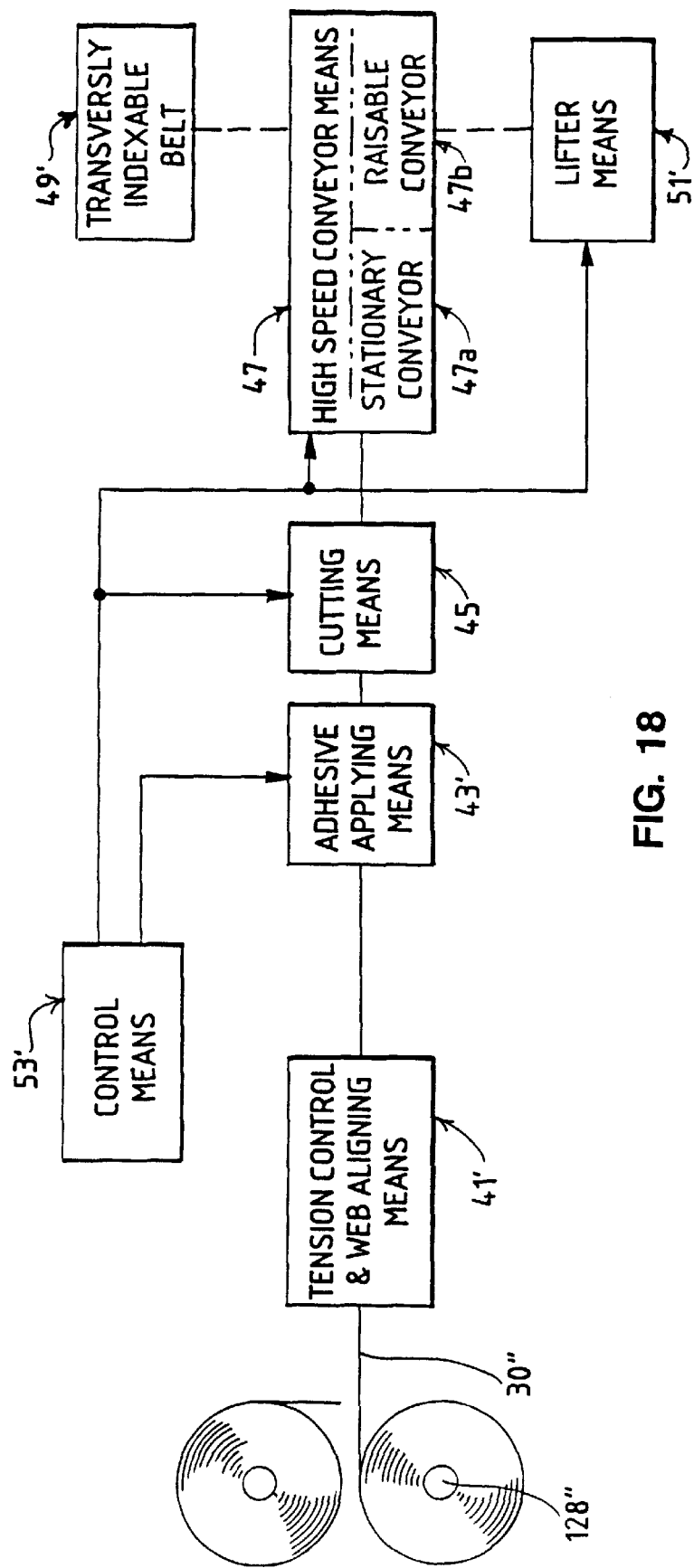
FIG. 18 is a block diagram showing how the multi-substrate web formed by the production line of FIG. 13 is further processed to form the light-controlling cellular panel of FIG. 15; and, FIG. 19 shows the strip delivery and lateral strip-shifting conveyor means used to laminate the multi-substrate strips together to form the light-controlling cellular panel of FIG. 15.
Figure 19:
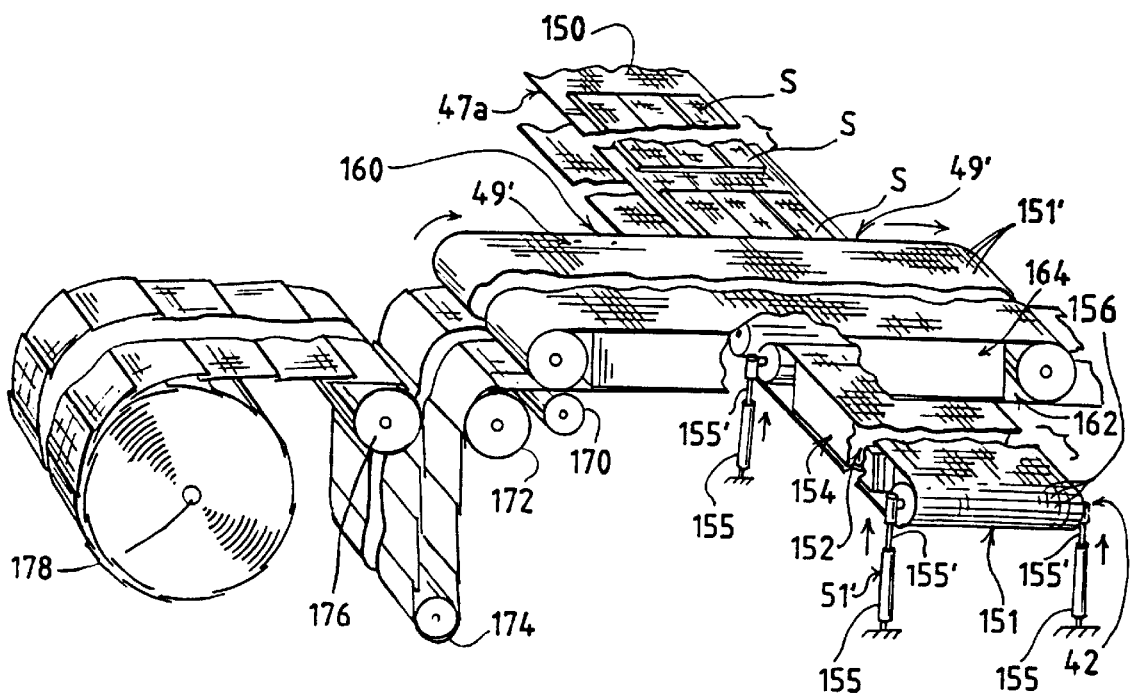

FIG. 18 is a block diagram showing the different steps of manufacturing the cellular panel 10‴ of FIG. 15. The laminated multi-substrate strips forming a web 30″ are unwound from a driven supply reel 128″ and pass through tension control and web aligning means 41′. Adhesive bands B and B′ are applied by adhesive applying means 43′ to the multi-substrate web 30″ and then the web 30″ is cut by cutting means 45 into strips S1,S2,S3, etc. The multi-substrate strips are then carried by high speed conveyor means 47, like that previously described to the raisable conveyer portion 47b. When the first strip S1 is laminated, the lifter means 51′ raises the raisable conveyor portion to where the first strip S1 is laminated against a leader strip (not shown) carried by an overhead laterally indexable conveyor belt. After the first strip S1 is laminated, the second strip S2 is laminated to the first strip in the pattern described with respect to FIG. 17, and the process continues with the third strip S3, etc. The control means 53′ control the operating sequence of the stations of the production line just described. FIG. 19 shows part of the manufacturing apparatus for making the light controlling closed tube cellular panel 10‴ of FIG. 15. After the multi-substrate web 30″ is cut into strips S1,S2,S3, etc., adhesive bands B and B′ are applied at the proper longitudinal margins as previously described. A conveyor belt 150, represented by the stationary conveyor block 47a in FIG. 18, receives the multi-substrate strips S1, S2, etc. The conveyor belt 150 is provided with suction holes communicating with a vacuum source (not show) to hold the strips thereon. The conveyor belt 150 conveys the strips to the raisable conveyor belt 151, represented by block 47b in FIG. 18. The raisable conveyor belt 151 also has suction holes 156 to allow a vacuum box 154, shown in FIG. 19, to hold the multi-substrate strips in place. To begin forming the cellular panel 10‴, the first multi-substrate strip is laminated to a leader strip located on a laterally indexable conveyor belt 160. When the first multi-substrate strip S1 is then properly positioned, the raisable conveyor 151 delivers the strip S1 to the overhead laterally indexable conveyor belt 160, represented by block 49′ in FIG. 18.

The laterally indexable conveyor belt 160 also has suction holes 151′ communicating with a vacuum box 164 to hold in place the first multi-substrate strip S1 adhered thereto. When the raisable conveyer belt 151 carrying the second multi-substrate strip stops S2, strip location sensors (not shown) in the conveyer belt structure 152 relay the location of the second multi-substrate strip S2 to the control means 53′ in FIG. 18. The control means 53′ then indexes the laterally indexable conveyer belt 160 in the direction shown by the arrows in FIG. 19 to the proper location where it stops to receive the second multi-substrate strip S2 delivered thereto. The raisable conveyer belt 151 is part of a structure connected to hydraulically operated portions 155′ of hydraulic cylinder 155 which then move the belt 151 upward to laminate the second substrate strip S2 on raisable conveyer belt 151 against the first multi-substrate strip S1 above it. This process continues with the subsequent strips. The belt 151 is then lowered by the pistons 155′. The sticking force of the adhesive bands B and B′ not yet fully cured, is desirably greater than the vacuum force holding the strip on the belt. If not, vacuum pressure on the belt 151′ is momentarily cut-off.

As this process continues, the laminated multi-substrate strips now forming a continuous web of laminated strips pass between the laterally indexable belt 160 and a nip roller 170. The continuous web then passes over an idler roller 172, under a dancer tensioning roller 174, which tensions the newly formed web, and over another idler roller 176 to a driven take-up reel 178. The speed of rewind reel 178 is controlled by the elevation of the dancer tensioning roller 174.

While the invention has been described with reference to preferred embodiments of the invention, it will be understood by those skilled in the art that various changes and modifications may be made and equivalents may be substituted for elements thereof without departing from the broader aspects of the invention.

What is claimed is:
1. An expandable and contractible cellular panel comprising:
   a plurality of parallel, tubular, elongated cells secured together, each cell consisting of a separate first sheet and a separate second sheet, each sheet having a pair of longitudinal edges, each respective first sheet and second sheet being attached to one another along at least one of their respective longitudinal edges, each cell being attached to an adjacent cell proximate their respective longitudinal edges.

2. The cellular panel of claim 1 wherein the first and second sheets of each cell are ultrasonically welded together along their respective longitudinal edges.

3. The panel of claim 1 wherein the adjacent cells are secured together by adhesive.

4. The panel of claim 3, wherein the longitudinal edges are not visible.

5. The panel of claim 4, wherein the proximate longitudinal edges are laterally offset from each other.

6. The panel of claim 5, wherein the adhesive extends over the longitudinal edges to join the cells together.

7. The cellular panel of claim 1, wherein the first sheet is a woven thermoplastic material and the second sheet is a non-woven thermoplastic material.

8. The cellular panel of claim 2 wherein the welded longitudinal edges have a thickness substantially less than the combined thickness of the first and second sheets.

9. An expandable and contractible cellular panel comprising:
- a plurality of parallel, aligned and elongated intermediate cells secured together, a pair of end cells, each cell consisting of a first sheet and a second sheet,
- each sheet having a first and a second longitudinal edge, a first longitudinal margin adjacent the first longitudinal edge, and a second longitudinal margin adjacent the second longitudinal edge,
- each cell having:
  - a top formed by the first longitudinal margins of the first and second sheets,
  - a bottom formed by the second longitudinal margins of the first and second sheets,
  - a front formed by a portion of the first sheet intermediate the first and second longitudinal margins thereof, and
  - a back formed by a portion of the second sheet intermediate the first and second longitudinal margins thereof,
  - the first and second sheets being proximate to one another along their respective first and second longitudinal margins, and
  - the top of each intermediate cell being attached to a bottom of an adjacent cell.

10. The panel of claim 9 wherein the first and second sheets of each cell are ultrasonically welded together along their respective second longitudinal edges.

11. The panel of claim 10 wherein the first and second sheets of each cell are ultrasonically welded together along their respective first longitudinal edges.

12. The panel of claim 11 wherein adjacent cells are secured together by adhesive.

13. The panel of claim 12, wherein when each cell is oriented so that the cells extend horizontally and are in vertically-spaced relation, the secured together marginal portions of the sheet are located on the top or bottom wall portion of each tubular section of the panel where they are not visible from the front or rear of the panel.

14. The panel of claim 9, wherein the longitudinal edges are not visible.

15. The panel of claim 9, wherein the first and second sheets are ultrasonically welded together along their respective first longitudinal edges.

16. The panel of claim 15, wherein the ultrasonically welded first and second pair of longitudinal margins are laterally offset from each other.

17. The panel of claim 12, wherein one of each of the pair of bands of adhesive are spaced apart and located on either side of the longitudinal edges.

18. The cellular panel of claim 9 wherein the first sheet is a woven thermoplastic material and the second sheet is a non-woven thermoplastic material.

19. The cellular panel of claim 16 wherein the welded portion has a thickness substantially less than the combined thickness of the first and second sheets.

20. A panel for covering windows and the like, the panel comprising:
- a plurality of discrete elongated open cells, each cell comprising an upper portion, a lower portion, a front portion and a back portion,
- each cell made from a first sheet of a first material and a second sheet of a second material, the first and second sheets being secured together along at least one of their confronting longitudinal margins, the first and second sheets of each cell being positioned in the panel to form the front portion of the cells and the second sheets of each cell being positioned in the panel to form the back portion of the cells.

21. The panel of claim 20 wherein the first sheet and the second sheet are also different appearing material of the same length and width secured together along only one of the longitudinal margins thereof and initially positioned in a common plane and the opposite longitudinal marginal portions of each sheet being folded over a central portion thereof to form an open tube, the open portion of the tube forming each cell is closed by its securement to the central portion of the folded strip of the adjacent tubular section of the panel.

22. An expandable and contractible cellular panel comprising:
- a plurality of parallel, aligned and elongated cells secured together and aligned in a single column, the plurality of cells including a first end cell and a second end cell and a plurality of intermediate cells therebetween,
- each cell consisting essentially of a separate first sheet and a separate second sheet,
- each sheet having a first and a second longitudinal edge, a first longitudinal margin adjacent the first longitudinal edge, and a second longitudinal margin adjacent the second longitudinal edge,
- each cell having:
  - a top wall portion formed by the first longitudinal margins of the first and second sheets,
  - a bottom wall portion formed by the second longitudinal margins of the first and second sheets,
  - a front wall portion formed by a portion of the first sheet intermediate the first and second longitudinal margins thereof, and
  - a rear wall portion formed by a portion of the second sheet intermediate the first and second longitudinal margins thereof,
  - the first and second sheets being attached to one another along at least one of their respective first and second longitudinal margins, and
  - the top wall portion of each intermediate cell being attached to the bottom wall portion of an adjacent cell.

23. The panel of claim 22 wherein the first and second sheets of each cell are ultrasonically welded together along their respective second longitudinal edges.

24. The panel of claim 23 wherein the first and second sheets of each cell are ultrasonically welded together along their respective first longitudinal edges.

25. The panel of claim 24 wherein adjacent cells are secured together by adhesive.

26. The panel of claim 25, wherein when each cell is oriented so that the cells extend horizontally and are in vertically-spaced relation, the secured together marginal portions of the sheets are located on the top or bottom wall portion of each tubular section of the panel where they are not visible from the front or rear of the panel.

27. The panel of claim 22, wherein the first and second sheets are ultrasonically welded together along their respective first longitudinal edges.

28. The panel of claim 27, wherein the ultrasonically welded first and second pair of longitudinal margins are laterally offset from each other.

29. The panel of claim 25, wherein the adhesive is a pair of bands of adhesive spaced apart and located on either side of the longitudinal edges.

30. The cellular panel of claim 22 wherein the first sheet is a woven thermoplastic material and the second sheet is a non-woven thermoplastic material.

31. A panel for covering windows, the panel comprising:
   a plurality of discrete elongated open cells, each cell comprising an upper portion, a lower portion, a front portion and a back portion,
   each cell made from a first sheet of a first material and a second sheet of a second material, the first and second sheets being secured together along at least one of their confronting longitudinal margins, the first and second sheets of each cell being positioned in the panel to form the front portion of the cells and the second sheets of each cell being positioned in the panel to form the back portion of the cells.

32. The panel of claim 31 wherein the first sheet and second sheet are also different appearing material of the same length and width secured together along only one of the longitudinal margins thereof and initially positioned in a common plane and the opposite longitudinal marginal portions of each sheet being folded over a central portion thereof to form an open tube, the open portion of the tube forming each cell is closed by its securement to the central portion of the folded strip of the adjacent tubular section of the panel.

33. The cellular panel of claim 1 wherein the first and second sheets of each intermediate cell are in contact with the first and second sheets respectively of adjacent cells.

34. The cellular panel of claim 1 wherein the cells are aligned in a single column.

35. The cellular panel of claim 1 wherein each first sheet is of a first material and each second sheet is of a second material.

36. The cellular panel of claim 1 wherein the first and second sheets of each cell are attached to one another along at least one of their respective longitudinal edges.

37. An expandable and contractible cellular panel comprising:
   a plurality of parallel, tubular, elongated cells secured together, each cell including a separate first sheet and a separate second sheet, each sheet having a pair of longitudinal edges, each respective first sheet and second sheet being attached to one another along at least one of their respective longitudinal edges, wherein each respective first sheet is formed of a different material than each respective second sheet,
   each cell being attached to an adjacent cell proximate their respective longitudinal edges.

* * * * *